(12) United States Patent
Boucké

(10) Patent No.: US 12,168,878 B2
(45) Date of Patent: Dec. 17, 2024

(54) DECORATIVE PANEL, AND DECORATIVE FLOOR COVERING CONSISTING OF SAID PANELS

(71) Applicant: I4F Licensing NV, Turnhout (BE)

(72) Inventor: Eddy Alberic Boucké, Menen (BE)

(73) Assignee: i4F Licensing NV, Turnhout (BE)

( * ) Notice: Subject to any disclaimer, the term of this patent is extended or adjusted under 35 U.S.C. 154(b) by 534 days.

(21) Appl. No.: 17/299,845

(22) PCT Filed: Sep. 30, 2019

(86) PCT No.: PCT/EP2019/076446
§ 371 (c)(1),
(2) Date: Jun. 4, 2021

(87) PCT Pub. No.: WO2020/114644
PCT Pub. Date: Jun. 11, 2020

(65) Prior Publication Data
US 2022/0034097 A1  Feb. 3, 2022

(30) Foreign Application Priority Data
Dec. 5, 2018 (NL) ...................................... 2022136

(51) Int. Cl.
*E04F 15/02* (2006.01)
*B32B 3/06* (2006.01)
(Continued)

(52) U.S. Cl.
CPC .......... *E04F 15/02038* (2013.01); *B32B 3/06* (2013.01); *B32B 5/022* (2013.01); *B32B 5/024* (2013.01); *B32B 5/18* (2013.01); *B32B 5/245* (2013.01); *B32B 7/12* (2013.01); *B32B 13/14* (2013.01); *B32B 25/14* (2013.01); *B32B 27/065* (2013.01); *B32B 27/12* (2013.01);
(Continued)

(58) Field of Classification Search
CPC ... E04F 13/0866; E04F 13/0894; E04F 13/18; E04F 15/105; E04F 15/107; E04F 2201/0161; E04F 2201/023; E04F 2201/042; E04F 2201/043; E04F 2203/026
See application file for complete search history.

(56) References Cited

U.S. PATENT DOCUMENTS 11,105,091 B1 * 8/2021 Pollock ................. B32B 27/065
2004/0206036 A1 * 10/2004 Pervan .................. E04F 15/041
52/578

(Continued)

FOREIGN PATENT DOCUMENTS

CN 113365809 A 9/2021
EP 2754688 A1 7/2014
(Continued)

*Primary Examiner* — Christine T Cajilig
(74) *Attorney, Agent, or Firm* — The Webb Law Firm

(57) ABSTRACT

In the field of decorative floor coverings, decorative panels are known having a MDF (Medium Density Board) or HDF (High Density Board) based core layer on top of which a decorative substrate is attached to provide the panels a desired appearance. The invention relates to a panel, in particular a decorative panel, a floor panel, a ceiling panel or a wall panel. The invention also relates to a floor covering consisting of a plurality of mutually coupled panels.

19 Claims, 13 Drawing Sheets

(51) Int. Cl.
  *B32B 5/02*   (2006.01)
  *B32B 5/18*   (2006.01)
  *B32B 5/24*   (2006.01)
  *B32B 7/12*   (2006.01)
  *B32B 13/14*  (2006.01)
  *B32B 25/14*  (2006.01)
  *B32B 27/06*  (2006.01)
  *B32B 27/12*  (2006.01)
  *B32B 27/18*  (2006.01)
  *B32B 27/30*  (2006.01)
  *B32B 27/32*  (2006.01)
  *E04F 13/08*  (2006.01)
  *E04F 13/18*  (2006.01)
  *E04F 15/10*  (2006.01)

(52) U.S. Cl.
  CPC ............ *B32B 27/18* (2013.01); *B32B 27/302* (2013.01); *B32B 27/304* (2013.01); *B32B 27/32* (2013.01); *E04F 13/0866* (2013.01); *E04F 13/0894* (2013.01); *E04F 13/18* (2013.01); *E04F 15/105* (2013.01); *E04F 15/107* (2013.01); *B32B 2264/0207* (2013.01); *B32B 2419/04* (2013.01); *B32B 2607/00* (2013.01); *E04F 2201/0161* (2013.01); *E04F 2201/023* (2013.01); *E04F 2201/042* (2013.01); *E04F 2201/043* (2013.01); *E04F 2203/026* (2013.01)

(56) References Cited

U.S. PATENT DOCUMENTS

| | | | | |
|---|---|---|---|---|
| 2005/0166514 | A1* | 8/2005 | Pervan | ............ E04F 15/02038 52/578 |
| 2005/0208255 | A1* | 9/2005 | Pervan | ................ E04F 15/045 428/60 |
| 2008/0098685 | A1* | 5/2008 | Polk | ........................ E04C 2/20 52/586.1 |
| 2009/0320402 | A1* | 12/2009 | Schacht | ................ E04F 15/041 52/745.05 |
| 2010/0293879 | A1* | 11/2010 | Pervan | ............. E04F 15/02038 52/588.1 |
| 2011/0305886 | A1 | 12/2011 | Phan et al. | |
| 2012/0180416 | A1 | 7/2012 | Perra et al. | |
| 2012/0266555 | A1* | 10/2012 | Cappelle | ........... E04F 15/02194 52/309.1 |
| 2013/0180193 | A1 | 7/2013 | Bossuyt | |
| 2016/0194885 | A1* | 7/2016 | Whispell | ........... E04F 15/02005 52/309.4 |
| 2016/0200034 | A1 | 7/2016 | Quanshan et al. | |
| 2017/0067261 | A1 | 3/2017 | Hannig et al. | |
| 2017/0328072 | A1* | 11/2017 | Hannig | ............. E04F 15/02038 |
| 2018/0002932 | A1 | 1/2018 | Van Giel et al. | |
| 2018/0010342 | A1 | 1/2018 | Van Hooydonck | |
| 2018/0187424 | A1* | 7/2018 | Chen | ................. E04F 15/02172 |
| 2019/0136545 | A1* | 5/2019 | De Rick | ............. E04F 15/107 |
| 2019/0211569 | A1* | 7/2019 | Boo | ...................... E04F 15/102 |
| 2019/0275771 | A1* | 9/2019 | Meyers | ................... B32B 27/34 |
| 2020/0340254 | A1* | 10/2020 | De Rick | ............. E04F 15/107 |
| 2022/0056703 | A1 | 2/2022 | Boucké | |

FOREIGN PATENT DOCUMENTS

| | | |
|---|---|---|
| GB | 2025321 A | 1/1980 |
| GB | 2474908 A | 5/2011 |
| JP | 2005232378 A | 9/2005 |
| JP | 200918577 A | 1/2009 |
| JP | 2015203061 A | 11/2015 |
| JP | 2017159507 A | 9/2017 |
| JP | 2018130161 A | 8/2018 |
| JP | 2018160025 A | 10/2018 |
| JP | 3218904 U | 11/2018 |
| TW | 201537005 A | 10/2015 |
| WO | 9831744 A1 | 7/1998 |
| WO | 2015130160 A1 | 9/2015 |
| WO | 2017115202 A1 | 7/2017 |
| WO | 2017121499 A1 | 7/2017 |
| WO | WO-2017122149 A1 * | 7/2017 ............ B32B 27/06 |
| WO | 2018215550 A1 | 11/2018 |

* cited by examiner

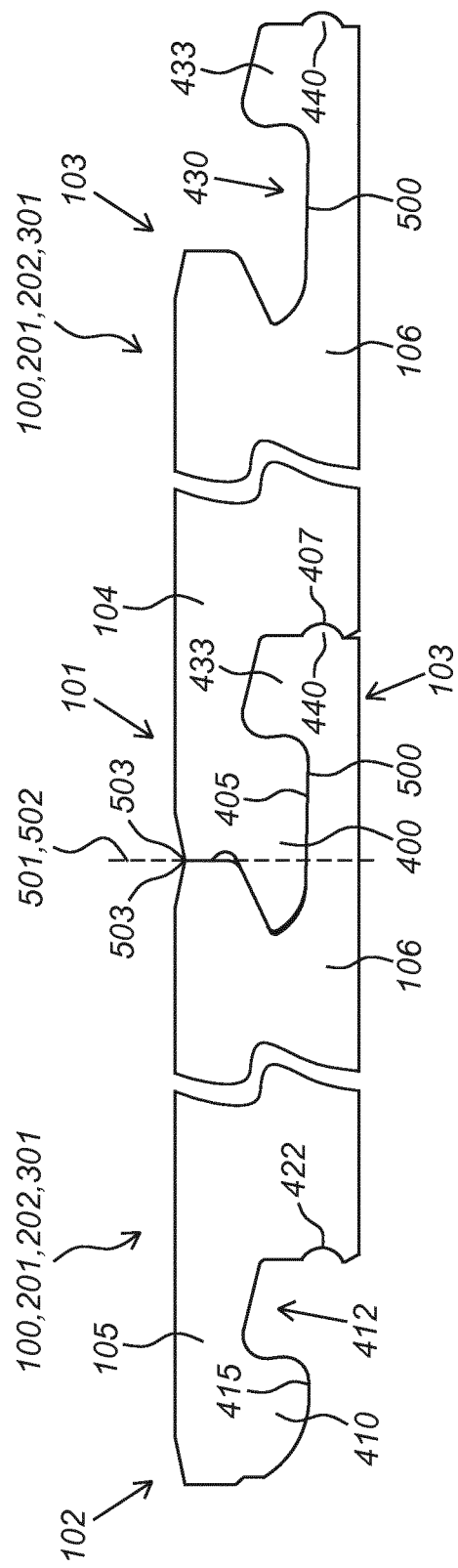
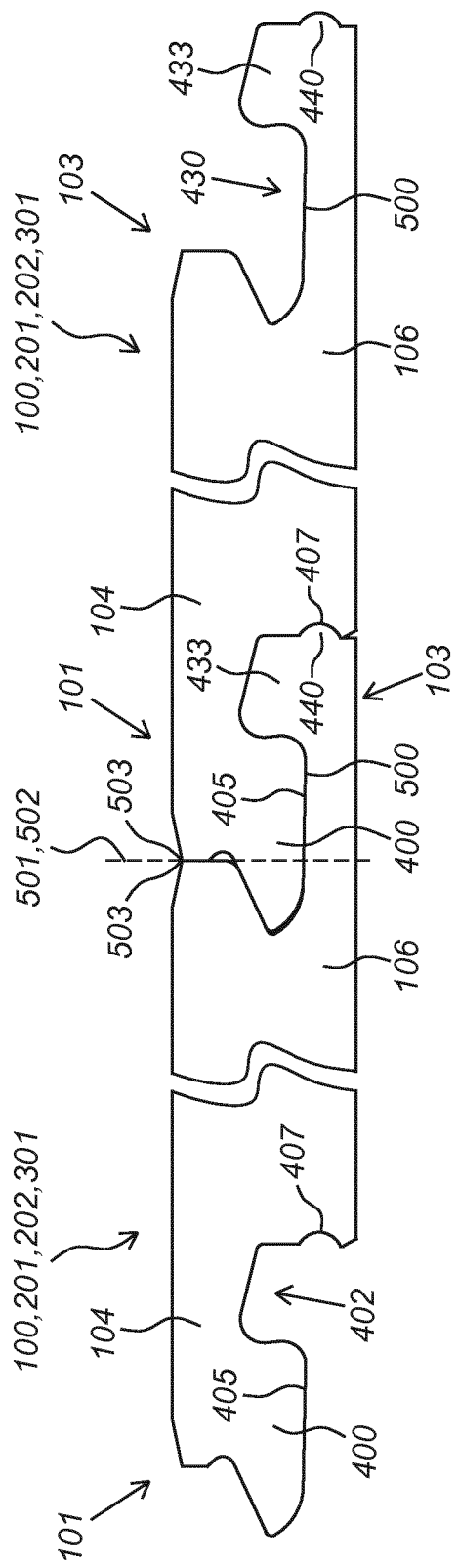
Fig. 5a
Fig. 5b

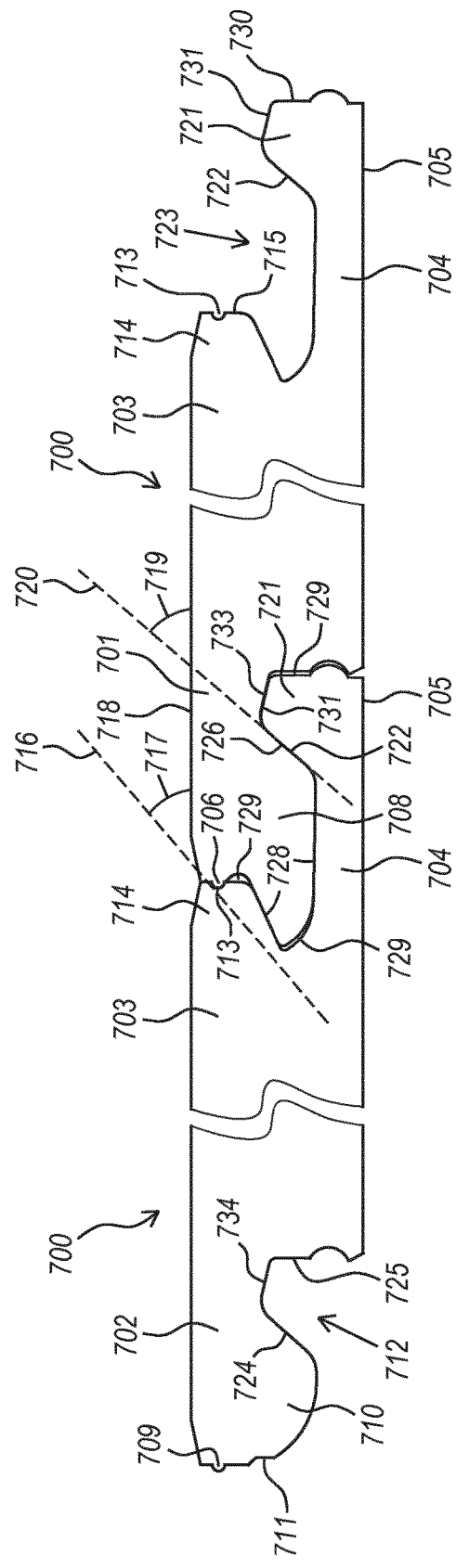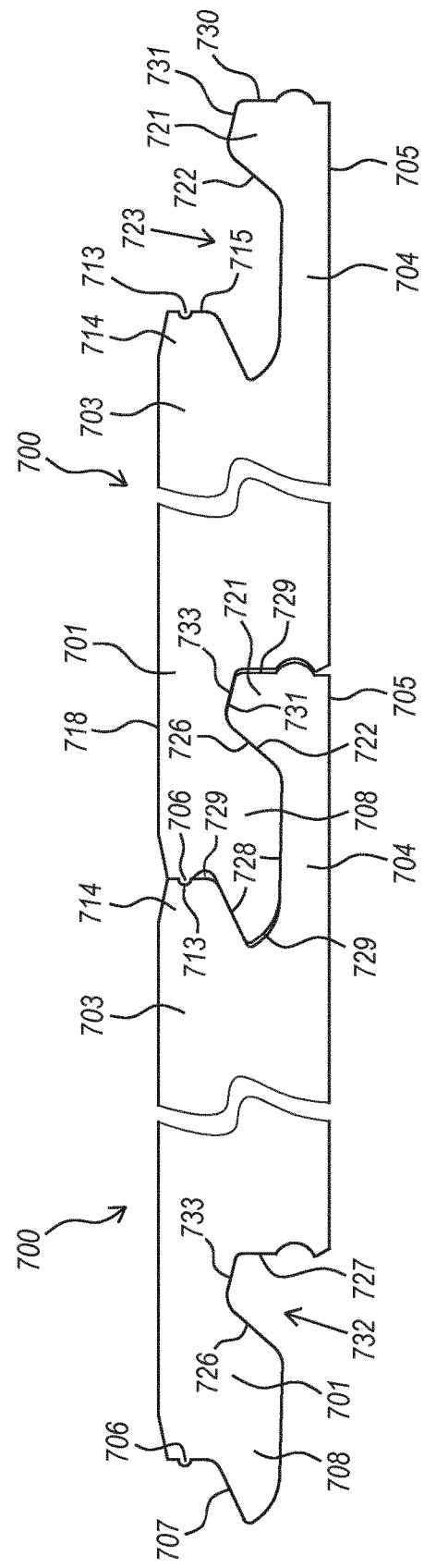

DECORATIVE PANEL, AND DECORATIVE FLOOR COVERING CONSISTING OF SAID PANELS

CROSS-REFERENCE TO RELATED APPLICATIONS

This application is the United States national phase of International Application No. PCT/EP2019/076446 filed Sep. 30, 2019, and claims priority to The Netherlands Patent Application No. 2022136 filed Dec. 5, 2018, the disclosures of which are hereby incorporated by reference in their entirety.

BACKGROUND OF THE INVENTION

Field of the Invention

The invention relates to a panel, in particular a decorative panel, a floor panel, a ceiling panel or a wall panel. The invention also relates to a floor covering consisting of a plurality of mutually coupled panels.

Description of Related Art

In the field of decorative floor coverings, decorative panels are known having a MDF (Medium Density Board) or HDF (High Density Board) based core layer on top of which a decorative substrate is attached to provide the panels a desired appearance. A major disadvantage of these known panels is the hygroscopic nature of the core layer, which affects the lifetime and durability of such panels. For this reason, the traditional MDF/HDF based panels are more and more replaced by polyvinyl chloride (PVC) based panels, also provided with a decorative substrate on top. These PVC based panels have the advantage over of being relatively waterproof compared to MDF/HDF based panels. The drawback, however, of these PVC based panels is that the temperature resistance is very poor, as a result of which these panels will typically easily deform (curve) in case these panels are exposed to a heating source, like a heating radiator or even a lamp. There is a constant need to improve the properties of the core material of decorative panels. There is also a need for alternative core compositions as used in panels. In addition there is a need to improve the properties of core of decorative panels.

SUMMARY OF THE INVENTION

It is an objective of the invention to meet at least one of the needs addressed above.

The above objective of the invention, is met by the provision of a panel, in particular a decorative panel, according to the above preamble, comprising a core provided with an upper side and a lower side, a decorative top structure affixed on said upper side of the core, a first panel edge comprising a first coupling profile, and a second panel edge comprising a second coupling profile being designed to engage interlockingly with said first coupling profile of an adjacent panel, both in horizontal direction and in vertical direction, wherein said core preferably comprises an alloy of a polymer and/or mineral matrix and elastic particles dispersed in said matrix, wherein the elastic particles are bond to the polymer and/or mineral matrix by means of a covalent bond. The core material is therefore not a mechanically realized blend, but rather a chemically realized alloy of at least two compounds, in particular polymer and/or mineral matrix material and an elastic material, chemically bonded to each other. This chemical (covalent (atomic)) bonding is typically realized during the production process of the core composition. In this manner a block copolymer is formed, which is thermally stable, durable, and moreover, provides the core a desired flexibility (elasticity) and impact resistance. Moreover, the realized blend finds a balance between functional properties, which are typically predominantly determined by the elastic particles, and processing properties, which are typically predominantly determined by the matrix material. The matrix material is also referred to as the hard phase of the core, and the dispersed elastic particles are often referred to as the soft phase of the core.

A polymer matrix is a matrix which is at least partially composed of polymeric material, wherein the polymeric material typically forms the main constituent. A mineral is a matrix which is at least partially composed of mineral material, wherein the mineral material typically forms the main constituent.

Preferably, the polymer matrix is at least partially composed of a polymer based on a renewable source (also referred to as 'bio-based plastic') and/or of a biodegradable polymer and/or a recycled polymer. Examples of suitable—typically non-biodegradable—bio-based plastics are bio-based polyethylene (bio-PE), bio-based polyethylene terephthalate (bio-PET), or polytrimethylene terephthalate (PTT). Examples of suitable—typically bio-degradable—bio-based plastics are polylactic acid (PLA), polyhydroxyalkanoate (PHA), and starch. Preferably, the polymer matrix comprises and/or consists of at least one polyolefin and/or at least one thermoplastic material, like e.g. polyethylene (PE), polypropylene (PP), polyvinylchloride (PVC), polyurethane (PUR), polystyrene (PS), polylactic acid (PLA), polyvinyl butyral (PVB), and/or polybutylene. It may also be preferred that the polymer matrix comprises isotactic polypropylene. It is also conceivable that the matrix material comprises at least one copolymer, preferably an ethylene-propylene copolymer. These polymer materials are typically relatively easy to melt and easy process, for example by means of (reactive) extrusion, and therefore allow the elastic particles to be mixed with the polyolefin and/or thermoplastic material within e.g. an extruding device. Here, it is preferred that the polymer matrix has an melt flow rate (MFR) of from about 20 to about 200 g/10 min. This typically facilitates processing of the matrix material.

The elastic particles have a greater elasticity than the matrix material. Typically, the elastic particles comprise at least one elastomer. An elastomer is a relatively flexible polymer. More, in particular an elastomer is typically a polymer with viscoelasticity (i.e., both viscosity and elasticity) and commonly has relatively weak intermolecular forces, generally low Young's modulus and high failure strain compared with other materials. The elastomer may be a crosslinked polymer. In a crosslinked polymer the separate polymer chains are tied together (crosslinked) typically leading to a single macromolecule. These chemical crosslinks may be normal crosslinks, which are covalent, and chemically bonding the polymer chains together into one molecule. However, the chemical crosslinks may also be, and are preferably formed by reversible crosslinks, which uses noncovalent, or secondary interactions between the polymer chains to bind them together. These interaction include hydrogen bonding and ionic bonding. The advantage of using noncovalent interactions to form crosslinks is that when the material is heated, the crosslinks are broken. This allows the material to be processed, and most importantly, recycled, and when the molten material cools again, the crosslinks reform. Examples of suitable polymers are polyisoprene, natural rubber, polybutadiene, polyisobutylene, and polyurethanes. Preferably, the elastic particles comprise ethylene-propylene rubber and/or ethylene-octene rubber and/or ethylene-propylene-diene terpolymer (EPDM). These materials have relatively good elastic and processing properties.

Preferably, any isotactic polypropylene (i-PP) conventionally employed in preparing polypropylene impact blends having a melt flow rate (MFR) of from about 0.001 to about 500 g/10 min. (230° C., 2160 g load as per ASTM D 1238) can be used in the core compositions of the panel according to this invention for forming the polymer matrix. Preferably, the isotactic polypropylene will have an MFR of from about 0.01 to about 200 g/10 min., more preferably from about 20 to about 200 g/10 min., and still more preferably from about 80 to about 200 g/10 min. As used in this specification, unless otherwise indicated, the term "about" means that the indicated values need not be exact, and they may be 10% greater or lower than the value shown. Normally, solid isotactic polypropylenes are preferably employed in the impact polypropylene composition of the present invention, i.e., polypropylenes of greater than 90% hot heptane insolubles. The particular density of the polypropylene is not critical. Preferred isotactic polypropylenes are normally crystalline and have densities ranging from about 0.90 to about 0.94 g/cc. Moreover, the composite material of the core, also referred to as alloy, can include several polypropylenes having different melt flow rates to provide a polypropylene impact blend having mechanical property characteristics as desired. As used herein, the term "isotactic polypropylene" is meant to include homopolypropylene, as well as copolymers of propylene and ethylene containing up to 8 weight percent of polymerized ethylene or other alpha-olefins.

Ethylene-propylene rubbers (EPR) may be used to compose at least a part of the elastic particles. An EPR is suitable to be mixed and covalently bonded to e.g. a polypropylene composition, constituting the polymer matrix material. The term "elastomer" and its derivatives will be used interchangeably with the term "rubber" and its corresponding derivatives.

Examples of ethylene-propylene rubbers (EPR) which are particularly useful in the present invention include saturated ethylene-propylene binary copolymer rubbers (EPM) and ethylene-propylene-non-conjugated diene terpolymer rubbers (EPDM), having the above-mentioned characteristics and containing about 1 to about 5 weight percent of a diene such as 5-ethylidene-2-norborene, 5-methylene-2-norborene, 1,4-hexadiene, dicyclopentadiene (DCPD), and the like. As used in this patent specification and in the appended claims, the term "ethylene-propylene rubber" (abbreviated as "EPR") is intended to encompass all of the aforementioned rubber types, namely EPR, EPM, or EPDM, as well as mixtures thereof.

While any of the EPR's described above may be advantageously employed in the instant invention, lower Tg (glass transition temperature) EPR's are preferred. This is because lower Tg EPR's perform better in simple binary mixtures of i-PP and EPR. For example, the Izod and Gardner impact properties of ICP's which consist of 80% by weight i-PP and 20% by weight EPR are significantly improved by lowering the Tg of the EPR. As the Tg of such binary blends of i-PP and EPR decreases from about −37 to about −50° C., the Gardner impact measured at −29° C. increases. At the same time, stiffness, as measured by the heat distortion temperature (HDT) and flexural modulus, remain essentially unchanged. Thus the most preferred EPR's of the present invention will have the lowest Tg achievable for a given EPR.

The Tg of a polymer can be conveniently measured by methods well known in the art, for example by differential scanning calorimetry (DSC) or dynamic mechanical thermal analysis (DMTA) techniques. As used herein, Tg will be understood to refer to the value for Tg obtained using the DMTA method based the tan δ peak, which is well known in the art.

The Tg of an EPR can be readily controlled by varying its ethylene content. The lowest Tg for commercially produced EPR's, about −50° C., occurs within a range of from about 35 to about 70 weight percent ethylene. Above this range, Tg increases due to the development of polyethylene crystallinity. In a similar fashion, Tg also increases due to the development of polypropylene crystallinity as ethylene content drops below this range. Those skilled in the art will understand that the relationship between Tg and ethylene content is readily measurable and is a continuous, smooth-curve function. There is, therefore, no well-defined point above or below which the Tg abruptly changes as ethylene content changes. Also, the catalyst used to produce the EPR will determine the ethylene content required to give the lowest Tg value. For example, when vanadium-based or metallocene-based single site catalysts are used, the EPR having the lowest Tg will have an ethylene content of about 45-55 weight percent, the Tg being in this case about −50° C. On the other hand, with traditional Ziegler-Natta titanium-based catalysts, which are usually multi-sited, the EPR having the lowest Tg will have an ethylene content of about 65-68 weight percent and a Tg of about −47° C.

Therefore, in a preferred embodiment, the EPR of the present invention will have a polymerized ethylene content of from about 35 to about 70 percent by weight, where the term "about" is used to indicate that variation above 70 percent or below 35 percent is acceptable, so long as the Tg of the EPR is within 5 degrees of the minimum value obtainable with the catalyst being employed.

High density polyethylenes, traditionally known as "HDPE," are defined herein to include those polyethylenes where the density is equal to or above 0.940 g/cc. The high-density polyethylenes usable as the high density polyethylene (hereinafter HDPE) matrix material in the present invention preferably include those having a density of 0.940 g/cc or greater, preferably 0.945 g/cc or greater, more preferably, 0.950 g/cc or greater, and most preferably 0.955 g/cc or greater. Such HDPE's generally include ethylene homopolymers and copolymers of ethylene with alpha-olefins (preferably having 3 to 12 carbon atoms, more preferably 3 to 8 carbon atoms). Preferable alpha-olefins are propylene, butene-1, hexene-1, 4-methy lpentene-1, and octene-1. Processes for making such polymers are well known in the art and include, for example, gas phase, slurry, and solution polymerization processes. The melt index of the HDPE determined under the conditions E according to ASTM D 1238 method, is generally 0.10 to 300 g/10 min., preferably 0.1 to 100 g/10 min., more preferably, 0.1 to 10 g/10 min. The molecular weight distribution (MWD) of the HDPE is not critical, although if the melt index of the HDPE is particularly low, it may be more desirable to use broader MWD HDPE's that are more shear-thinning and less viscous under extrusion conditions in order to facilitate melt mixing. An HDPE of this type that has been found to be suitable is Exxon HDZ-126, which has a melt index, as defined above, of about 0.35 g/10 min. and a density of 0.957 g/cc.

As mentioned above, am ethylene-propylene copolymer (hereinafter referred to either as "ethylene-propylene copolymer" or "EPC") may be used as matrix material in the panel according to the present invention. This EPC preferably comprises from about 10 to about 30 weight percent polymerized ethylene and from about 90 to about 70 weight percent polymerized propylene. Preferably, the ethylene-propylene copolymer will have a polymerized ethylene content of about 14% to about 27% by weight, and more preferably about 14% to about 20% by weight. The weight average molecular weight (Mw) of the ethylene-propylene copolymer is preferably in the range of from about 50,000 to about 500,000, more preferably from about 75,000 to about 300,000, and most preferably from about 100,000 to about 200,000.

The ethylene-propylene copolymer (EPC) of the invention may be prepared using metallocene or conventional Ziegler-Natta type catalysts. In either case, the polymerization may be carried out in gas phase, solution, or slurry polymerization processes. For example, a satisfactory process for preparing the ethylene-propylene copolymer comprises contacting ethylene and propylene monomers, under polymerization conditions and in such a ratio as to give the desired polymerized composition, with a metallocene catalyst which yields isotactic polypropylene having a tacticity greater than about 80 percent. An example of a metallocene catalyst is activated dimethylsilanyl bis(indenyl) hafnium dimethyl.

Alternatively, the inventive EPC may be prepared using a conventional Ziegler-Natta catalyst which can yield similar isotactic polypropylenes.

The core preferably comprises at least one mineralizer selected from the group consisting of: sodium hydroxide (NaOH), calcium chloride ($CaCl_2$), aluminium sulphate ($Al_2(SO_4)_3$), and calcium hydroxide $Ca(OH)_2$. As addressed above, the panel according to the invention may comprise one or more fillers, such as cellulose based particles, in particular lignocellulose based particles, in particular fibres. Preferably, the cellulose based particles comprise wood, straw, and/or hemp. Previous research shows that wood and hemp are chemically heterogeneous and its components can be divided into two groups: structural components of high molecular weight-natural polymer substances (cellulose, hemicelluloses and lignin) which are the major cell wall components, and non-structural components of low molecular weight (extractives and inorganic components). Both wood and wood fibres comprise many chemical components, but it was found that the main inhibitor of core hydration is sugar. Several chemical treatments are preferably to the natural fibres, such as wood fibres or hemp fibres, before mixing them with the (initially fluid) polymer(s). The compressive strength and other mechanical properties of the treated wood fibre composites are higher than those of the untreated fibres. Chemicals such as sodium hydroxide (NaOH), calcium chloride ($CaCl_2$), and aluminium sulphate ($Al_2(SO_4)_3$), sometimes also referred to as mineralization agents (mineralizers), typically improves compatibility of core and plant origin aggregates. Complex mineralizers such as $Al_2(SO_4)_3+Ca(OH)_2$ may also be applied. When $Al_2(SO_4)_3$ is used as a mineralizer, it impedes the release of sugar from organic aggregates and reduces hygroscopicity and water absorption. $Al_2(SO_4)_3$ in the form of hydrate is the characteristic of an acidic reaction in water, and calcium hydroxide [$Ca(OH)_2$] is characteristic of an alkaline reaction in water. The mineralization is achieved by enhancing the efficiency of $Al_2(SO_4)_3$, at least partially neutralizing the acidic environment caused by $Al_2(SO_4)_3$ and improving the workability of the mixture. Wood aggregate mineralization also leads to improved adhesion between the wood particles and the polymer, as a result of which are more stable, coherent polymer can be realized.

As mentioned above, at least a part of the cellulose based particles is formed by fibres. It is also imaginable that at least a part of the cellulose based particles is formed by powder, (wood) shavings, (wood) wool, and/or (wood) chips. Instead of wood, also other natural fibres may be used, such as hemp. Hemp enriched polymer also exhibit a relatively good thermal insulation material, excellent hydric properties, great acoustic capabilities, and good fire resistance. Here, typically hemp shiv is used as coarse aggregate (basic component). Like with wood, the hemp shiv is preferably mineralized by $Al_2(SO_4)_3$, neutralized with $Ca(OH)_2$ and mixed with the (initially fluid/liquid) polymer.

Preferably, the core and/or the backing layer comprises at least one filler chosen from the group consisting of: a mineral, preferably calcium carbonate; a pigment, a modifier, fibers, such as glass fibers, wood, straw, and/or hemp. The fibers may be loose fibers and/or interconnected fibers resulting in a woven or non-woven layer.

The core comprises preferably at least one additional filler selected from the group consisting of: steel, glass, polypropylene, wood, acrylic, alumina, curaua, carbon, cellulose, coconut, kevlar, nylon, perlon, polyethylene, PVA, rock wool, sisal, and fique. This may further increase the strength of the panel and/or the water resistivity and/or the fireproof properties of the panel as such.

Alternatively, the core comprises a mineral, such as magnesium oxide, magnesium hydroxide, and/or magnesium cement. This mineral material may function as matrix material, instead of or in addition to a polymeric matrix material.

Preferably, the core comprises sodium carboxymethyl cellulose (CMC). It was found that the addition of CMC to the core (during production) facilitates and even promotes self-degradation of said polymer based core, in particular a polymer, in an alkaline aqueous environment and at elevated temperature (200° C. or higher). Hence, this will improve the biodegradability of the panel. At this elevated temperature, CMC emitted two major volatile compounds, $CO_2$ and acetic acid, creating a porous structure in core. CMC also reacted with NaOH from sodium silicate, if applied, to form three water-insensitive solid reaction products, disodium glycolate salt, sodium glucosidic salt, and sodium bicarbonate. Other water-sensitive solid reaction products, such as sodium polysilicate and sodium carbonate, were derived from hydrolysates of sodium silicate.

Preferably, the core comprises silica fume. Silica fume, also known as microsilica, is an amorphous (non-crystalline) polymorph of silicon dioxide, silica. It is an ultrafine powder collected as a by-product of the silicon and ferrosilicon alloy production and typically consists of spherical particles with an average particle diameter of 150 nm. By incorporation of silica fume in the core, in particular the polymer, the water resistivity as well as the fireproof properties can be improved significantly. The silica fume may affect the compressive strength of the core though, as a result of which the amount of silica fume is preferably kept limited to an amount equal to or lower than 10% by weight.

The core may comprise iron oxide ($Fe_2O_3$), preferably in an amount of less than 6% by weight. Iron oxide imparts colour to core. Moreover, at a very high temperature, iron oxide chemically reacts with calcium and aluminium, which could also be present in the core, to form tricalcium alumino-ferrite, which material (tricalcium alumino-ferrite)

improves hardness and strength of the core. Preferably, the amount of alumina ($Al_2O_3$) in the core is situated in between 3 and 8% by weight. Preferably, the amount of calcium sulfate needed for the aforementioned reaction will typically be between up to (and including) 0.5% by weight.

The core preferably comprises fatty acids. Fatty acids may penetrate through channels (pores) of raw minerals (if applied) before grinding, and will facilitate the (efficiency of the) grinding process to produce mineral based core powder.

The core may comprise at least one alkali metal sulfate, such as magnesium sulfate. This will commonly accelerate the production process of the core.

Typically, and as mentioned above, the core comprise at least one polymer as matrix material, such as polyvinylchloride (PVC), polystyrene (PS) and/or polyurethane (PUR), and/or a thermoplastic polyolefin. The polymer used may be virgin, recycled, and/or a mixture of virgin and/or recycled polymer material may be used. Preferably only one (a single) polymer material is used to facilitate further recyclability. PS may be in the form of expanded PS (EPS) in order to further reduce the density of the panel, which leads to a saving of costs and facilitates handling of the panels. Other polymers, in particular thermoplastics may also be used. It is also imaginable that rubber parts (particles) are dispersed within at least one core to improve the flexibility at least to some extent. The at least one polymer, if applied, may be applied within the core in the form of a sheet (closed layer), a mesh (woven), a non-woven, and/or as separate polymer particles (such as fibers, beads, spheres, etc.). In case a polymer layer is applied the layer is preferably enclosed on both sides by composite material and is therefore preferably embedded within said core.

Preferably, the core comprises perlite, preferably expanded (foamed) perlite. Perlite is an amorphous volcanic glass that has a relatively high water content, typically formed by the hydration of obsidian. Perlite has the unusual property of greatly expanding when heated sufficiently, which could significantly reduce the density of the core, and hence of the panel as such. It is preferred that core comprises moreover foamed perlite of different particle size values. Closed cell foamed perlite may lead to the achievement of a porosity (of perlite) of 30-40%. Said perlite can be preliminarily processed by siliconic solutions, sodium, potassium and lithium silicates.

The core may moreover comprise one or more additive materials advantageously including surface active substances (SAS) such as methylcellulose, "Badimol" plasticizing materials and other cation-active SAS's for improving the rheology of the mixture. The core may also comprise bentonite, that is a finely ground natural product, adapted to increase rheology and waterproof characteristics of the panel as such.

The core may also comprise at least one fire-retardant additive. This fire-retardant additive is preferably formed by an organ halogen compound. Such compounds are able to remove reactive H and OH radicals during a fire. The organ halogen compound preferably comprises bromine and/or chlorine. Recommended from a viewpoint of fire retardance over an organochlorine compound such as PCB (polychlorinated biphenyl) is an organ bromine compound such as PBDE (polybrominated diphenyl ether). Other examples of applicable brominated compounds are: Tetrabromobisphenol A, Decabromodiphenyl ether (Deca), Octabromodiphenyl ether, Tetrabromodiphenyl ether, Hexabromocyclododecane (HBCD), Tribromophenol, Bis(tribromophenoxy) ethane, Tetrabromobisphenol A polycarbonate oligomer (TBBA or TBBPA), Tetrabromobisphenol A epoxy oligomer (TBBA or TBBPA), and Tetrabromophthalic acid anhydride. Other examples of applicable chlorinated compounds are: Chlorinated paraffin, Bis(hexachlorocyclopentadieno)cyclooctane, Dodecachloride pentacyclodecane (Dechlorane), and 1,2,3,4,7,8,9,10,13,13,14,14-dodecachloro-1,4,4a,5,6, 6a,7,10,10a,11,12,12a-dodecahydro-1,4,7,10-dimethanodibenzo[a,e]cyclooctene (Dechlorane Plus). Although halogenated flame retardants are particularly effective, they generally have the drawback that toxic smoke can result in the case of fire. It is therefore also possible to envisage applying one or more alternative, less toxic fire-retardant additives, including intumescent (foaming) substances. The operating principle of these alternative additives is based on formation of a foam layer which functions as oxygen barrier and therefore also has a fire-retardant effect. Such intumescent additives generally comprise melamine or a salt derived therefrom. An example hereof is a mixture of polyphosphates (acid donor) in co-action with a melamine (foaming agent) and a carbon donor such as dipentaerythritol, starch or pentaerythritol. Gaseous products such as carbon dioxide and ammonia gas are formed here in the case of fire. The formed foam layer is stabilized by cross-linking, as in the case of vulcanization. Other examples of applicable, relatively environmentally-friendly, melamine-based additives are: melamine cyanurate, melamine polyphosphate and melamine phosphate.

In order to save weight, and therefore cost, it may be advantageous that the core is at least partially foamed. The foamed structure may comprises open pores (cells) and/or closed pores (cells). The elastic particles are typically dispersed within the matrix material present in between the cells, wherein at least a number of the elastic particles may form a wall of the cells.

Although the core(s) may be provided with one or more plasticizers, such as phthalates, DOTP, DINP, and/or DIDP in order to provide more flexibility to the core(s) (and to the panel as such), it is preferred that each composite is preferably free of any plasticizer in order to increase the rigidity of the core of the panel, and which is, moreover, also favourable from an environmental point of view.

The at least one reinforcement layer is preferably a non-woven layer or woven layer, in particular a cloth, for example made by fiberglass. They may have a thickness of 0.2-0.4 mm. It is also conceivable that each tile comprises a plurality of the (commonly thinner) base layer stacked on top of each other, wherein at least one reinforcing layer is situated in between two adjacent base layers. Preferably, the density of the reinforcing layer is preferably situated between 1.000 and 2.000 $kg/m^3$, preferably between 1.400- and 1.900 $kg/m^3$, and more preferably between 1.400-1.700 $kg/m^3$. At least one reinforcement layer may comprise natural fibers, such as jute. At least one reinforcement layer comprises synthetic fibers, in particular polymer fibers, such as nylon fibers.

Preferably, the core comprises at least 50% by weight, preferably in between 50 and 90% by weight, of polymer. Preferably, the core comprises in between 1 and 15% by weight of cellulose based fibers. Preferably, the core comprises in between 0 and 3% by weight of perlite. Preferably, the core comprises in between 1 and 8% by weight of reinforcement layer.

In a preferred embodiment, at least one core has a density greater than 1 $kg/m^3$. This relatively high density will commonly lead to strong and rigid panels. It is, however, also imaginable that at least one core has a density lower than 1 $kg/m^3$, which leads to a saving in weight and therefore in transporting and handling costs. The lower density can e.g. be achieved by applying one or more foamed ingredients, such as expanded perlite, expanded polystyrene, etc.

It is imaginable that the core is provided with a waterproof coating substantially covering the at least one core. This may further improve the waterproof properties of the panel as such. To this end, the waterproof coating may be a two-component liquid-applied waterproofing formulation for application as a liquid to at least one (outer surface of at least one) core. Typically, this coating comprises: separate components A and B which are transportable in separate containers and are combinable to form a blend in which vulcanization is initiated solidifying the components into a membrane wherein component A comprises an aqueous latex of a natural or synthetic rubber and component B comprises an oil carrier in which is dispersed a vulcanizing agent operative to cure the rubber in component A, and a hygroscopic agent operative to chemically bind the water in component A. Component A preferably comprises a latex stabilizer operative to increase the working life of the latex by controlling the initial pH of the latex components. It is also discovered that additions of potassium hydroxide (KOH) dissolved in minimal amounts in component A can lengthen the setting time, but excessive amounts may destabilize and cause premature gelation of the latex. A preferred addition rate, therefore, is up to 1.5 parts per 100 parts of rubber. It is believed that other high pH additives, such as ammonia or sodium hydroxide (NaOH) may be used. Accordingly, an exemplary component A of the invention may comprise 0 to 2.5 phr (per hundred parts rubber). Component B contains, among other things, an oil 12 carrier fluid for the vulcanization agent and hygroscopic agent. In preferred embodiments, the oil carrier fluid is a blend of hydrocarbon oils, such as a blend of both aromatic and paraffinic compositions. The aromatic oils which preferentially swell the rubber particles are generally more viscous. Fluidity can be controlled by the addition of paraffinic oils of lower viscosity which also serve to adjust the setting time of the composition. In other exemplary embodiments, synthetic liquid plasticizers such as phthalates, adipates, or other commonly used rubber plasticizers can be used. The carrier fluid 12 may also contain a proportion of bitumen, either oxidized or penetration grade. The level of aromatic oil is not likely to be less than 50% of the oil carrier fluid, and the bitumen not greater than 30%. The presence of the bitumen, however, is not critical to the invention. Also optional is the use of a hard synthetic or natural resin. The oil 12 carrier fluid will comprise 20-60% by total weight of the formulation (when components A and B are combined). Component B typically contains a vulcanization agent or package. Preferably, the vulcanization package comprises elemental sulphur as the sulphur donor for the system, zinc oxide as a vulcanization activator, and a mixture of zinc iso-propyl xanthate (ZIX) and zinc dibutyl dithiocarbamate dibutylamine complex (ZDBCX) as accelerators. These may be used in the preferred ranges, respectively, 0.5 to 15.0 phr (parts sulphur based on parts hundred of rubber), 0.5 to 20.0 phr (ZnO), 0.1 to 5.0 phr (ZIX), and 0.1 to 5.0 phr (ZDBCX). Other known vulcanizing agents and/or packages are believed to be suitable for use in the invention. Component B may also comprise a hygroscopic agent or dessicant for chemically binding the water of component A. The preferred hygroscopic agent is calcium oxide. Other hygroscopic agents may include other metal oxides which react with water to form hydroxides, e.g., magnesium, barium, etc. Hydraulic cores, such as Portland core, or high alumina core, calcium sulphate core (plaster of paris), magnesium oxide, or magnesium oxychloride core, may also be used.

The hygroscopic agent may also comprise anhydrous salts which absorb significant proportions (25% or more) of their own weight of water, such as borax. The weight of the hygroscopic agent is chosen to effectively dewater the latex, with preferably a slight excess to ensure that the water is bound up. However, it is possible that partial desiccation of the latex may be used, i.e., less than stoichiometric quantities of hygroscopic agent used. The hygroscopic agent, depending upon which is chosen, can comprise 10-50% of the total formulation system. Component B may also comprise one or more rheology modifiers. Preferably, a combination of montmorillonite clay (activated with a chemical activator) and stearate-coated calcium carbonate is used to achieve the desired balance of rheological properties, although other options, such as organo-treated bentonite clays, fumed silica, polymer fibers, ground rubber, pulverized fly ash, hollow glass microspheres, and hydrogenated castor oils, could be employed. The amount of rheology modifiers, depending upon the material chosen, could comprise 0.5 to 25.0% weight total solids in the formulation system (components A and B combined).

It is also conceivable that a waterproof layer is situated in between the core and the top structure. This may further improve the waterproof properties of the panel as such. The waterproof layer may have the same composition as the composition of the waterproof coating described above, but may also be formed by a polymer layer, such as a PVC layer.

It is not unlikely that core comprises a plurality of reinforcement layers. For example, at least one first reinforcement layer may be located in a top portion of the core, and wherein at least one second reinforcement layer may be located in a bottom portion of the core.

It is imaginable that the core comprises a laminate of cores, which are either directly and/or indirectly, stacked onto each other. The cores may have an identical composition, though may also have mutually different compositions, which allows the properties for each core to be tweaked and to be adapted for its own primary function (e.g. sound-dampening, providing strength, providing flexibility, etc.).

The core preferably comprises at least one catalyst to promote the formation of covalent bonds between the matrix, in particular the polymer matrix, and the dispersed elastic particles. The catalyst is also referred to as compatibilizer. A suitable catalyst is a metallocene catalyst, preferably activated dimethylsilanyl bis(indenyl) hafnium dimethyl, and/or a MgCl2/phthalate/TiCl4 catalyst.

The top structure is preferably adhered onto the core by means of a waterproof adhesive. This makes shields the core(s) from water applied to the top structure, which renders the panel as such more waterproof. Moreover, this prevents that the top structure easily delaminates from the core. Preferably, the top structure is adhered to the core by using a alkoxysilyl, preferably methoxysily,1 based adhesive, more preferably a dimethoxysilyl and/or trimethoxysilyl adhesive. More preferably, this methoxysilyl based adhesive (polymer) is acryl modified. Preferably, said methoxysilyl based adhesive (polymer) comprises a polyether based backbone chain having one or more methoxysilyl (end) groups. These silyl modified polymers (SMP) are polymers (large, chained molecules) terminating with a silyl group. Typically, these adhesives have good adhesion on a wide range of substrate materials, and have good temperature and UV resistance. It is imaginable that this kind of alkoxysilyl based adhesive is used to glue down the panel to a subfloor, a wall, or a ceiling. It is imaginable that this kind of alkoxysilyl based adhesive is used to adhere a backing to a rear surface of the core and/or a further backing to a rear side of the backing layer (if applied). This leads to an integrated sublayer which may act as subfloor or an equivalent thereof for wall and ceiling applications. This backing may be elastic, and may for example be formed by a cushion layer. This backing typically comprises a polymer, preferably an elastomer and/or PVC (polyvinyl chloride) and/or PUR (polyurethane) and/or PVB (polyvinyl butyral) and/or a polyolefin, in particular PE or PP. However, wood, cork, and other backings are also imaginable.

As plasticizer in this adhesive polypropylene glycol is preferably used. Preferably, the adhesive also comprises at least one of the following ingredients: at least one silane (acting as moisture scavenger and/or adhesion promotor), a catalyst, e.g. DOT (dioctyltin), at least one antioxidant, at least one mineral filler, like calcium carbonate, preferably ground calcium carbonate which is less susceptible for moisture than precipitated calcium carbonate. Preferably all the aforementioned ingredients are present in the (waterproof) adhesive. This adhesive is typically a 1K adhesive.

The top structure preferably comprises at least one decorative layer and at least one transparent wear layer covering said decorative layer. A lacquer layer or other protective layer may be applied on top of said wear layer. A finishing layer may be applied in between the decorative layer and the wear layer. The decorative layer will be visible and will be used to provide the panel an attractive appearance. To this end, the decorative layer may have a design pattern, which can, for example be a wood grain design, a mineral grain design that resembles marble, granite or any other natural stone grain, or a colour pattern, colour blend or single colour to name just a few design possibilities. Customized appearances, often realized by digital printing during the panel production process, are also imaginable. The decorative top structure may also be formed by a single layer. In an alternative embodiment, the decorative top structure is omitted, thus not applied, in the panel according to the invention. In this latter embodiment, the decorative panel, in particular a floor panel, ceiling panel or wall panel, comprising: a core provided with an upper side and a lower side, a first panel edge comprising a first coupling profile, and a second panel edge comprising a second coupling profile being designed to engage interlockingly with said first coupling profile of an adjacent panel, both in horizontal direction and in vertical direction, wherein said core comprises: at least one core comprising: at least one polymer, cellulose based particles dispersed in said polymer; and at least one reinforcement layer embedded in said core. Preferably, the top structure comprises cork, more preferably at least one cork layer.

Preferably, the panel comprises a backing layer attached to a rear side of the core. The at least one backing layer is preferably at least partially made of a flexible material, preferably an elastomer. The thickness of the backing layer typically varies from about 0.1 to 2.5 mm. Non-limiting examples of materials whereof the backing layer can be made of are polyethylene, cork, polyurethane and ethylene-vinyl acetate. The thickness of a polyethylene backing layer is for example typically 2 mm or smaller. The backing layer commonly provides additional robustness, dimensional stability, and/or impact resistances to the panel as such, which increases the durability of the panel. Moreover, the (flexible) backing layer may increase the acoustic (sound-dampening) properties of the panel. In a particular embodiment, the backing layer is provided with at least one plasticizer. It is imaginable that a rear side of the backing layer is provided with at least one microbial based coating to prevent and/or impede bacterial growth underneath the panels once installed.

Preferably, at least one reinforcement layer extends in only one coupling profile of the first and second coupling profile. This can be realized by designing the first coupling profile and the second coupling profile in such a way that a vertically extending tongue-groove (fold-down) connection is formed, typically by using an upper profile and a lower profile, a preferred example of which will be given below. The advantage of applying the reinforcing layer in only one coupling profile, typically aforementioned lower profile, and thus not in the complementary coupling profile, typically aforementioned upper profile, is that the flexibility of the one profile (upper profile) is greater than the flexibility of the other profile (lower profile). This typically means that the upper profile is easier to deform than the lower profile, and this is in particular advantageous in case deformation is needed to realize a coupling between the coupling profiles.

Preferably, the first coupling profile comprises:
an upward tongue,
at least one upward flank lying at a distance from the upward tongue,
an upward groove formed in between the upward tongue and the upward flank wherein the upward groove is adapted to receive at least a part of a downward tongue of a second coupling profile of an adjacent panel, and
at least one first locking element, preferably provided at a distant side of the upward tongue facing away from the upward flank,
and preferably the (complimentary) second coupling profile comprises:
a first downward tongue,
at least one first downward flank lying at a distance from the downward tongue,
a first downward groove formed in between the downward tongue and the downward flank, wherein the downward groove is adapted to receive at least a part of an upward tongue of a first coupling profile of an adjacent panel, and
at least one second locking element adapted for co-action with a first locking element of an adjacent panel, said second locking element preferably being provided at the downward flank.

Preferably, the first locking element comprises a bulge and/or a recess, and wherein the second locking element comprises a bulge and/or a recess. The bulge is commonly adapted to be at least partially received in the recess of an adjacent coupled panel for the purpose of realizing a locked coupling, preferably a vertically locked coupling. It is also conceivable that the first locking element and the second locking are not formed by a bulge-recess combination, but by another combination of co-acting profiled surfaces and/or high-friction contact surfaces. In this latter embodiment, the at least one locking element of the first locking element and second locking element may be formed by a (flat of otherwise shaped) contact surface composed of a, optionally separate, plastic material configured to generate friction with the other locking element of another panel in engaged (coupled) condition. Examples of plastics suitable to generate friction include:

Acetal (POM), being rigid and strong with good creep resistance. It has a low coefficient of friction, remains stable at high temperatures, and offers good resistance to hot water;

Nylon (PA), which absorbs more moisture than most polymers, wherein the impact strength and general energy absorbing qualities actually improve as it absorbs moisture. Nylons also have a low coefficient of friction, good electrical properties, and good chemical resistance;

Polyphthalamide (PPA). This high performance nylon has through improved temperature resistance and lower moisture absorption. It also has good chemical resistance;

Polyetheretherketone (PEEK), being a high temperature thermoplastic with good chemical and flame resistance combined with high strength. PEEK is a favourite in the aerospace industry;

Polyphenylene sulphide (PPS), offering a balance of properties including chemical and high-temperature resistance, flame retardance, flowability, dimensional stability, and good electrical properties;

Polybutylene terephthalate (PBT), which is dimensionally stable and has high heat and chemical resistance with good electrical properties;

Thermoplastic polyimide (TPI) being inherently flame retardant with good physical, chemical, and wear-resistance properties.

Polycarbonate (PC), having good impact strength, high heat resistance, and good dimensional stability. PC also has good electrical properties and is stable in water and mineral or organic acids; and Polyetherimide (PEI), maintaining strength and rigidity at elevated temperatures. It also has good long-term heat resistance, dimensional stability, inherent flame retardance, and resistance to hydrocarbons, alcohols, and halogenated solvents.

It is imaginable that the first coupling profile and the second coupling profile are configured such that in coupled condition a pretension is existing, which forces coupled panels at the respective edges towards each other, wherein this preferably is performed by applying overlapping contours of the first coupling profile and the second coupling profile, in particular overlapping contours of downward tongue and the upward groove and/or overlapping contours of the upward tongue and the downward groove, and wherein the first coupling profile and the second coupling profile are configured such that the two of such panels can be coupled to each other by means of a fold-down movement and/or a vertical movement, such that, in coupled condition, wherein, in coupled condition, at least a part of the downward tongue of the second coupling part is inserted in the upward groove of the first coupling part, such that the downward tongue is clamped by the first coupling part and/or the upward tongue is clamped by the second coupling part.

In a preferred embodiment, the panel comprises at least one third coupling profile and at least one fourth coupling profile located respectively at a third panel edge and a fourth panel edge, wherein the third coupling profile comprises:

a sideward tongue extending in a direction substantially parallel to the upper side of the core, at least one second downward flank lying at a distance from the sideward tongue, and a second downward groove formed between the sideward tongue and the second downward flank, wherein the fourth coupling profile comprises:

a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

The panel, typically the core, in particular at least one core, preferably comprises recycled material. Recycled material typically relates to reusing left-over material resulting from prior (panel) production processes.

Preferably, at least one groove, and preferably each groove, is provided with at least one antimicrobial substance. This provides a sound barrier for bacteria, fungi, etc.

The core preferably has a thickness of at least 3 mm, preferably at least 4 mm, and still more preferably at least 5 mm. The panel thickness is typically situated in between 3 and 10 mm, preferably in between 4 and 8 mm.

The invention also relates to a decorative covering, in particular a decorative floor covering, decorative ceiling covering, or decorative wall covering, comprising a plurality of mutually coupled decorative panels according to the invention. The covering may also be installed at vertical corners, such as at inside corners of intersecting walls, pieces of furniture, and at outside corners, such as at entry ways. The floor covering may be used indoors or outdoors.

Preferred, non-limitative embodiments of the invention are presented in the clause set below:

1. Decorative panel, in particular a floor panel, ceiling panel or wall panel, comprising:

a core provided with an upper side and a lower side, a decorative top structure affixed on said upper side of the core, a first panel edge comprising a first coupling profile, and a second panel edge comprising a second coupling profile being designed to engage interlockingly with said first coupling profile of an adjacent panel, both in horizontal direction and in vertical direction, wherein said core optionally comprises an alloy of a polymer and/or mineral matrix and elastic particles dispersed in said matrix, wherein, preferably, the elastic particles are bond to the polymer and/or mineral matrix by means of a covalent bond.

2. Panel according to clause 1, wherein the polymer matrix comprises a polyolefin 3. Panel according to clause 1 or 2, wherein the polymer matrix comprises thermoplastic.

4. Panel according to clause 1 or 2, wherein the polymer matrix comprises polyethylene (PE), and/or polypropylene (PP), and/or polybutylene.

5. Panel according to one of the foregoing clauses, wherein the polymer matrix comprises isotactic polypropylene.

6. Panel according to one of the foregoing clauses, wherein the elastic particles comprise an elastomer.

7. Panel according to one of the foregoing clauses, wherein the elastic particles comprise ethylene-propylene rubber 8. Panel according to one of the foregoing clauses, wherein the elastic particles comprise ethylene-propylene-diene terpolymer (EPDM).

9. Panel according to one of the going clauses, wherein the core comprises an isotactic polypropylene, an ethylene-propylene rubber, and a high density polyethylene.

10. Panel according to one of the foregoing clauses, wherein the core comprises an ethylene-propylene copolymer.

11. Panel according to one of the foregoing clauses, wherein the polymer matrix has an melt flor rate (MFR) of from about 20 to about 200 g/10 min.

12. Panel according to one of the foregoing clauses, wherein the core is free of phthalate, and preferably free of any plasticizer.

13. Panel according to one of the foregoing clauses, wherein at least one polymer matrix used in the core is a recycled material.

14. Panel according to one of the previous clauses, wherein at least one polymer and/or at least one plasticizer used in the core is biobased material.

15. Panel according to one of the previous clauses, wherein at least one polymer of the core is formed by PVC (polyvinyl chloride).

16. Panel according to one of the previous clauses, wherein at least one polymer of the core is formed by PUR (polyurethane).

17. Panel according to one of the previous clauses, wherein at least one polymer of the core is formed by PVB (polyvinyl butyral).

18. Panel according to one of the previous clauses, wherein at least one polymer of the core is formed by polystyrene, preferably expanded polystyrene.

19. Panel according to one of the previous clauses, wherein the core comprises one plasticizer selected from the group consisting of: DOTP, DINP, DIDP.

20. Panel according to one of the previous clauses, wherein the core comprises at least one catalyst to promote the formation of covalent bonds between the polymer matrix and the dispersed elastic particles.

21. Panel according to clause 20, wherein the catalyst is a metallocene catalyst, preferably activated dimethylsilanyl bis(indenyl) hafnium dimethyl.

22. Panel according to clause 20 or 21, wherein the catalyst is a MgCl2/phthalate/TiCl4 catalyst.

23. Panel according to one of the previous clauses, wherein the polymer matrix and the elastic particles dispersed in said matrix form a block copolymer.

24. Panel according to one of the previous clauses, wherein the panel comprises a backing layer applied, directly or indirectly, to a rear surface of the core, wherein said backing layer comprises at least one polymer and, optionally, at least one plasticizer.

25. Panel according to clause 24, wherein at least one polymer used in the backing layer is a recycled material.

26. Panel according to clause 24 or 25, wherein at least one polymer used in the backing layer is biobased material.

27. Panel according to one of the clauses 24-26, wherein at least one polymer of the backing layer is formed by PVC (polyvinyl chloride) or PUR (polyurethane).

28. Panel according to one of the clauses 24-27, wherein the backing layer is at least partially made of a natural material, such as cork.

29. Panel according to one of the previous clauses, wherein at least one polymer of the backing layer is formed by PVB (polyvinyl butyral).

30. Panel according to one of the previous clauses, wherein at least one polymer of the backing layer is formed by a polyolefin, in particular PE or PP.

31. Panel according to one of the previous clauses, wherein the core and/or the backing layer comprises at least one filler chosen from the group consisting of: a mineral, preferably calcium carbonate, more preferably ground calcium carbonate; a pigment, a modifier, fibers.

32. Panel according to one of the previous clauses, wherein the core and/or the backing layer comprises the cellulose based particles, which preferably comprise lignocellulose, such as wood or hemp.

33. Panel according to one of the previous clauses, wherein the core comprises at least one additional filler selected from the group consisting of: steel, glass, polypropylene, wood, acrylic, alumina, curaua, carbon, cellulose, coconut, kevlar, nylon, perlon, polyethylene, PVA, rock wool, sisal, and fique.

34. Panel according to one of the previous clauses, wherein at least one polymer of the core is foamed.

35. Panel according to one of the previous clauses, wherein the core comprises perlite, preferably expanded perlite.

36. Panel according to one of the previous clauses, wherein the core comprises at least one fire-retardant additive.

37. Panel according to one of the previous clauses, wherein the panel comprises at least one reinforcement layer, preferably a non-woven layer or woven layer, in particular a cloth.

38. Panel according to one of the previous clauses, wherein the reinforcement layer comprises fiberglass.

39. Panel according to one of the previous clauses, wherein the reinforcement layer comprises natural fibers, such as jute.

40. Panel according to one of the previous clauses, wherein the reinforcement layer comprises synthetic fibers, in particular polymer fibers.

41. Panel according to one of the previous clauses, wherein the at least one reinforcement layer is embedded in the core.

42. Panel according to one of the previous clauses, wherein the core comprises in between 1 and 15% by weight of cellulose based fibers.

43. Panel according to one of the previous clauses, wherein the core comprises in between 1 and 8% by weight of reinforcement layer.

44. Panel according to one of the previous clauses, wherein at least one core has a density greater than 1 kg/m3.

45. Panel according to one of the previous clauses, wherein at least one core has a density lower than 1 kg/m3.

46. Panel according to one of the previous clauses, wherein the core is provided with a waterproof coating substantially covering the at least one core.

47. Panel according to one of the previous clauses, wherein a top surface of the core is covered by a barrier layer which is substantially impermeable for at least one plasticizer used in the core.

48. Panel according to one of the previous clauses, wherein a waterproof layer, in particular waterproof adhesive, is situated in between the core and the top structure.

49. Panel according to one of the previous clauses, wherein the top structure is adhered onto the core by means of a waterproof adhesive, preferably a methoxysilyl based adhesive.

50. Panel according to one of the previous clauses, wherein the panel comprises a plurality of reinforcement layers, wherein, preferably, at least one first reinforcement layer is located in a top portion of the core, and wherein at least one second reinforcement layer is located in a bottom portion of the core.

51. Panel according to one of the previous clauses, wherein the core comprises a laminate of cores, which are either directly and/or indirectly, stacked onto each other.

52. Panel according to one of the previous clauses, wherein the core comprises a laminate of cores, wherein the composition of at least two cores is mutually different.

53. Panel according to one of the previous clauses, wherein the top structure comprises at least one decorative layer and at least one transparent wear layer covering said decorative layer.

54. Panel according to clause 53, wherein the wear layer has a melt temperature of above 100 degrees Celsius, wherein the wear layer is preferably made of polyurethane.

55. Panel according to one of the previous clauses, wherein the top structure comprises cork, preferably a cork layer.

56. Panel according to one of the previous clauses, wherein at least one reinforcement layer extends in only one coupling profile of the first and second coupling profile.

57. Panel according to one of the previous clauses, wherein the panel thickness is situated in between 2 and 10 mm, preferably in between 3 and 10 mm.

58. Panel according to one of the previous clauses, wherein the first coupling profile comprises:
an upward tongue,
at least one upward flank lying at a distance from the upward tongue,
an upward groove formed in between the upward tongue and the upward flank wherein the upward groove is adapted to receive at least a part of a downward tongue of a second coupling profile of an adjacent panel, and
at least one first locking element, preferably provided at a distant side of the upward tongue facing away from the upward flank,
and wherein the second coupling profile comprises:
a first downward tongue,
at least one first downward flank lying at a distance from the downward tongue,
a first downward groove formed in between the downward tongue and the downward flank, wherein the downward groove is adapted to receive at least a part of an upward tongue of a first coupling profile of an adjacent panel, and
at least one second locking element adapted for co-action with a first locking element of an adjacent panel, said second locking element preferably being provided at the downward flank.

59. Panel according to any of the previous clauses, wherein the panel comprises at least one third coupling profile and at least one fourth coupling profile located respectively at a third panel edge and a fourth panel edge, wherein the third coupling profile comprises:
a sideward tongue extending in a direction substantially parallel to the upper side of the core,
at least one second downward flank lying at a distance from the sideward tongue, and
a second downward groove formed between the sideward tongue and the second downward flank,
wherein the fourth coupling profile comprises:
a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

60. Panel according to one of the previous clauses, wherein the panel is rigid, flexible or semi-flexible.

61. Panel according to one of the previous clauses, wherein the core comprises a mixture of three kinds of terephthalate-based material; and epoxidized oil, wherein weight ratio of the terephthalate-based material and the epoxidized oil is preferably from 99:1 to 1:99.

62. Panel according to one of the foregoing clauses, wherein the core comprises oil, preferably epoxidized oil, more preferably at least one epoxidized oil selected from the group consisting of: epoxidized soybean oil, epoxidized castor oil, epoxidized linseed oil, epoxidized palm oil, epoxidized stearic acid, epoxidized oleic acid, epoxidized tall oil, epoxidized linoleic acid or mixtures thereof.

63. Panel according to one of the previous clauses, wherein the core comprises at least one mineral filler, preferably calcium carbonate, magnesium oxide, magnesium hydroxide, and/or magnesium based cement.

64. Decorative covering, in particular a decorative floor covering, decorative ceiling covering, or decorative wall covering, comprising a plurality of mutually coupled decorative panels according to any of clauses 1-63

The ordinal numbers used in this document, like "first", "second", and "third" are used only for identification purposes. Hence, the use of the expressions "third locking element" and "second locking element" does therefore not necessarily require the co-presence of a "first locking element".

The decorative panels according to the invention may also be referred to as decorative tiles. By "complementary" coupling profiles is meant that these coupling profiles can cooperate with each other. However, to this end, the complementary coupling profiles do not necessarily have to have complementary forms. By locking in "vertical direction" is meant locking in a direction perpendicular to the plane of the panel. By locking in "horizontal direction" is meant locking in a direction perpendicular to the respective coupled edges of two panels and parallel to or falling together with the plane defined by the panels.

BRIEF DESCRIPTION OF THE DRAWINGS

The invention will be elucidated on the basis of non-limitative exemplary embodiments shown in the following figures, wherein:

FIGS. 5a-5c show a cross-section of two multi-purpose panels as shown in FIG. 1a, 2a or 3a in a first, second and third coupled condition respectively;

FIGS. 7a-7c show a cross-section of two multi-purpose panels with further alternative coupling profiles in a first, second and third coupled condition respectively.

DESCRIPTION OF THE INVENTION

Figure 1A:
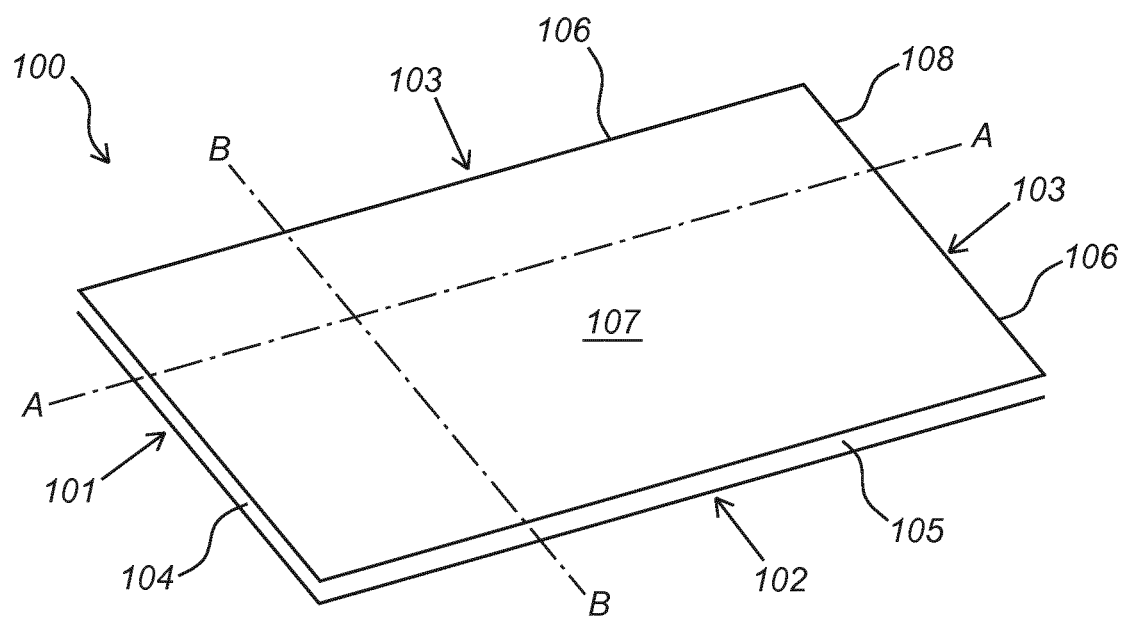
FIG. 1 a shows a schematic representation of a multi-purpose panel for use in a multi-purpose panel system according to the invention.
FIG. 1*b* shows a schematic representation of a multi-purpose panel system comprising a plurality of multi-purpose panels as shown in FIG. 1*a;*

FIG. 1a shows a schematic representation of a multi-purpose decorative panel (100) for use in a multi-purpose panel system (110) according to the invention. The figure shows a panel (100) comprising a first pair of opposing edges consisting of a first edge (101) and an opposite third edge (103) and a second pair of opposing edges consisting of a second edge (102) and an(other) opposing third edge (103). The first, second and third edges (101, 102, 103) are respectively provided with first, second and third coupling profiles (104, 105, 106). The first coupling profile (104) and the third coupling profile (106) are configured such that two of such panels (100) can be coupled to each other at the first and third edges (101, 103) by means of a turning movement. Moreover, the second coupling profile (105) and the third coupling profile (106) are configured such that the two of such panels (100) can be coupled to each other at the second and third edges (102, 103) by means of a fold-down movement and/or a vertical movement. The proportional relationship between the width and the length of the panel (100) may be chosen at will. FIG. 1a shows only one of the many possibilities wherein the panel has a upper side (107) with a rectangular contour (108). It is however also possible that the width and the length of the panel (100) are the same such that the panel (100) has an upper side (107) with a square contour.

Figure 1B:
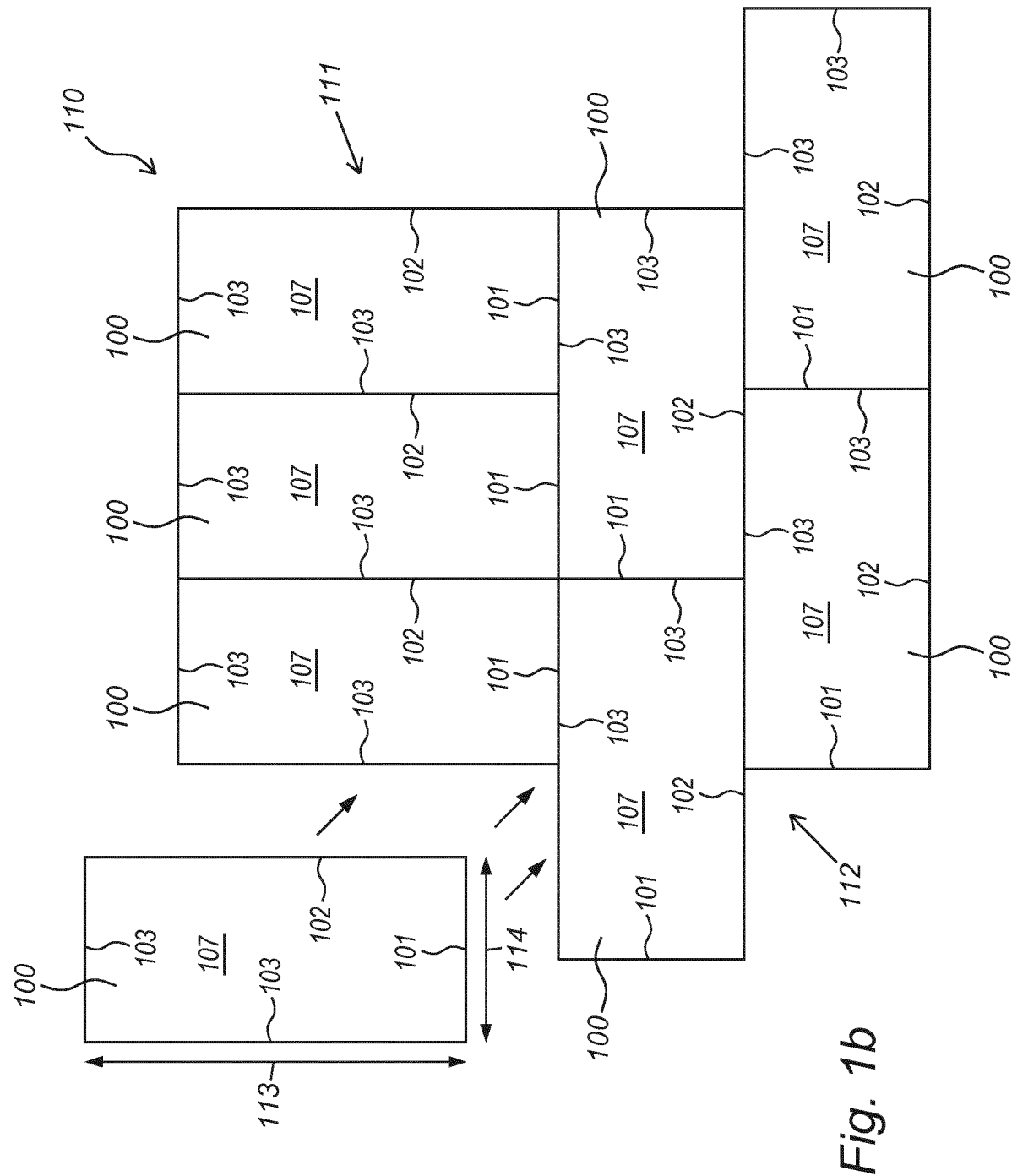

FIG. 1b shows a schematic representation of a multi-purpose panel system (110) comprising a plurality of multi-purpose panels (100) as shown in FIG. 1a. Although each of the panels (100) are equivalent, having a first pair of opposing edges consisting of a first edge (101) and an opposite third edge (103) and a second pair of opposing edges consisting of a second edge (102) and an opposing third edge (103), the panels (100) may, due to the compatibility of the coupling profile of the third edge (103) with the coupling profile of both the first and the second edge (101, 102), be joined in different ways, resulting in differential panel patterns (111, 112) within one multi-purpose panel system (110). In the depicted multi-purpose panel system (110) wherein the individual panels (110) have an upper side (107) with a rectangular contour (108), the panels (100) each have a long side (113) and a short side (114). The different panel patterns (111, 112) are hereby created by coupling a first panel pattern (111) of interconnected panels (100), having their long side (113) connected to the long side (113) of an adjacent panel (100), to a second panel pattern (112) of interconnected panels (100), having their long side (113) connected to the long side (113) of an adjacent panel (100) and their short side (114) connected to the short side (114) of another adjacent panel (100). The first and second panel patterns (111, 112) are hereby rotated to each other such that the long sides (113) of the panels (100) of the first panel pattern (111) lie at a 90 degree angle relative to the long sides (113) of the panels (100) of the second panel pattern (112). This coupling between the different panel patterns (111, 112) is made possible through the connection of the short sides (114) of the panels (100) of the first panel pattern (111) to the long sides (113) of the panels (100) of the second panel pattern (112). Installation of the panel system (110) can be realized by angling down the first edge (101) of a panel (100) to be installed with respect to a third edge (103) of an already installed panel (100), which will commonly mutually lock said panels (100) in both vertical and horizontal direction. During this angling or turning movement of the panel (100) to be installed with respect to the already installed panel (100), the second edge (102) of the panel (100) to be installed will be connected (simultaneously) to the third edge (103) of another already installed panel (100), which is typically realized by lowering or folding down the panel (100) to be installed with respect to the other already installed panel (100) during which the second edge (102) of the panel (100) to be installed and the third edge (103) of the other already installed panel (100) will be scissored (zipped) into each other. This results in a locking of the panel (100) to be installed with respect to the other already installed panel (100) both in horizontal and vertical direction.

Figure 2A:
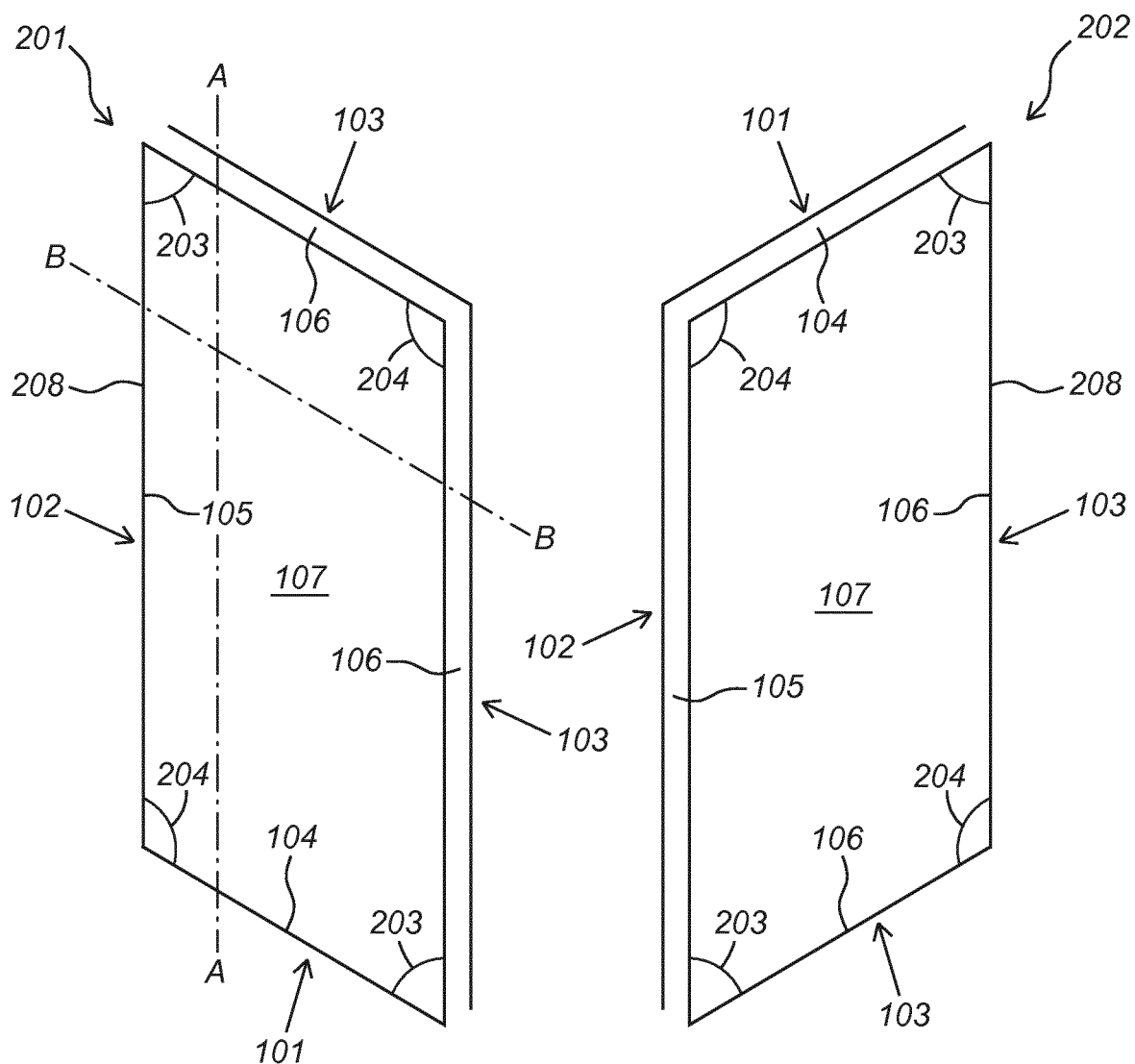
FIG. 2*a* shows a schematic representation of two different types of multi-purpose panels for use in another embodiment of a multi-purpose panel system according to the invention.

FIG. 2a shows a schematic representation of two different types of multi-purpose panels (201, 202) for use in another embodiment of a multi-purpose panel system (200) according to the invention. Just as the multi-purpose panel (100) shown in FIG. 1a, each of these panels (201, 202) comprises a first pair of opposing edges consisting of a first edge (101) and an opposite third edge (103) and a second pair of opposing edges consisting of a second edge (102) and an opposing third edge (103). Again, the first, second and third edges (101, 102, 103) are respectively provided with first, second and third coupling profiles (104, 105, 106), wherein the first coupling profile (104) and the third coupling profile (106) are configured such that two panels (201, 202) can be coupled to each other at the first and third edges (101, 103) by means of a turning movement, and the second coupling profile (105) and the third coupling profile (106) are configured such that the two panels (201, 202) can be coupled to each other at the second and third edges (102, 103) by means of a fold-down movement and/or a vertical movement. This time however, there are two different types of panels (201, 202), wherein the coupling profiles (105, 106) of one pair of opposing edges (102, 103) on the first type of panel (201) are arranged in a mirror-inverted manner relative to the coupling profiles (105, 106) of the corresponding pair of opposing edges (102, 103) on the second type of panel (202). Note that the depicted edge pairs of the different types of panels (201, 202) that are mirror-inverted are formed by second and third edges (102, 103). However it is likewise possible that the mirror-inverted edge pairs are formed by first and third edges (101, 103). Moreover, the multi-purpose panels (201, 202) for use in this multi-purpose panel system (200) have an upper side (107) with a parallelogram-shaped contour (208). Two adjoining edges (101, 102, 103) of these panels (201, 202) hereto either enclose an acute angle (203) or a obtuse angle (204). In this specific embodiment, the first and second edge (101, 102) respectively the third edges (103) enclose an obtuse angle (204) of the same size, while the first and the third edge (101, 103) respectively the second and third edge (102, 103) enclose an acute angle (203) of the same size. The difference in panel configuration and parallelogram-shaped contour (208) of their upper side (107) allows these panels (201, 202) to form a chevron pattern (205) in a joined state.

Figure 2B:
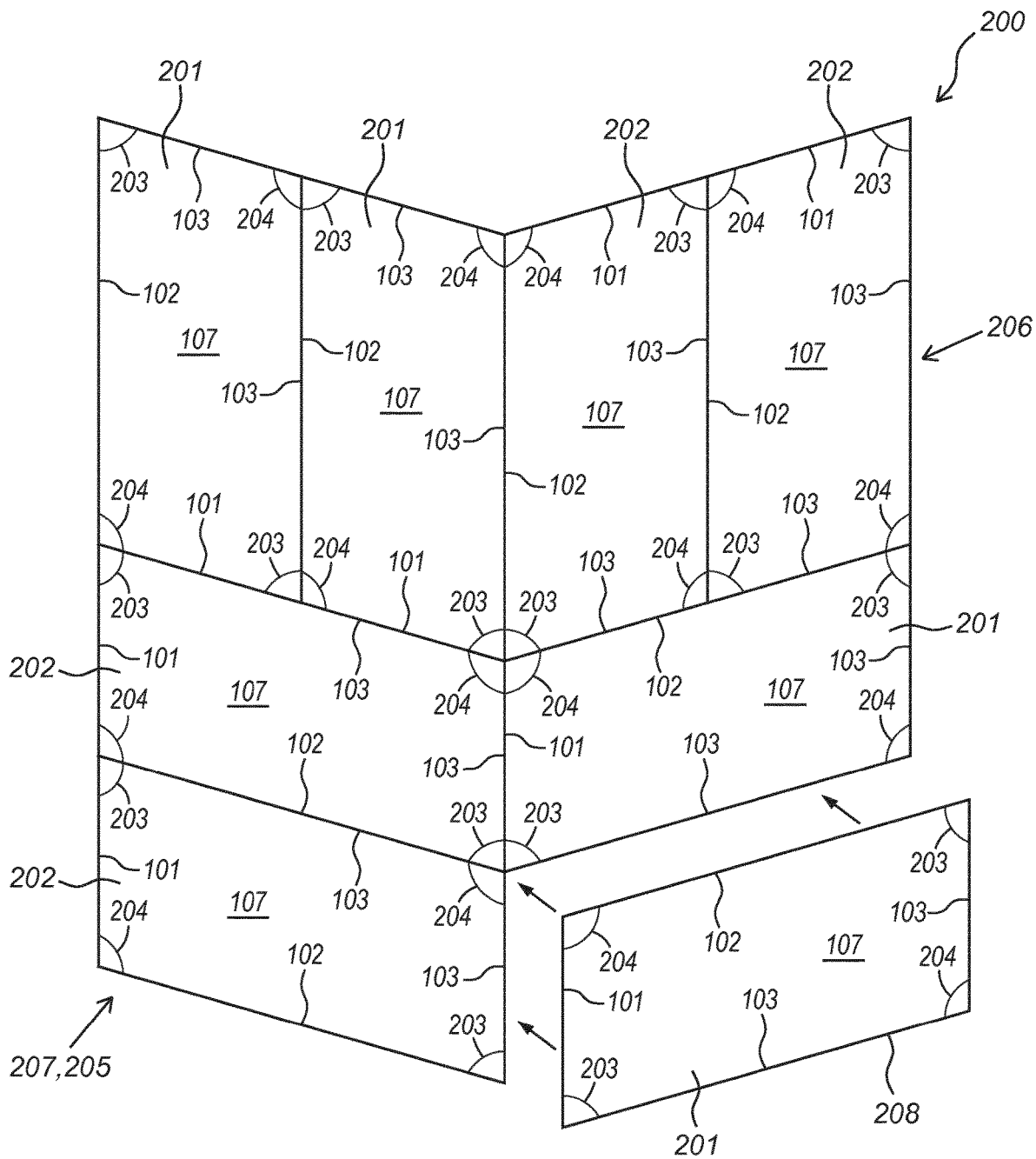
FIG. 2*b* shows a schematic representation of a multi-purpose panel system comprising a plurality of multi-purpose panels as shown in FIG. 2*a;*

FIG. 2b shows a schematic representation of a multi-purpose panel system (200) comprising a plurality of multi-purpose panels (201, 202) as shown in FIG. 2a. As already discussed previously, the multi-purpose panels (201, 202)

forming part of this multi-purpose panel system (200) come in two different (mirrored) types/configurations. While the difference in panel configuration and parallelogram-shape of their top surface (107) allows these panels (201, 202) to form a chevron pattern (205) in a joined state, having a first pair of opposing edges consisting of a first edge (101) and an opposite third edge (103) and a second pair of opposing edges consisting of a second edge (102) and an opposing third edge (103), wherein the coupling profile (106) of the third edge (103) is compatible with the coupling profile (104, 105) of both the first and the second edge (101, 102), allows the panels (201, 202) to be joined in different ways as well, resulting in differential panel patterns (206, 207) within one interconnected multi-purpose panel system (200). Like in the multi-purpose panel system (110) shown in FIG. 1 b, the different panel patterns (206, 207) are created by coupling a first panel pattern (206) of interconnected panels (201, 202) to a second panel pattern (207) of interconnected panels (201, 202). Within these separate panel patterns (206, 207), each panel (201, 202) has each of its pairs of opposing edges (101, 103; 102, 103) connected to the edges (101, 102, 103) of adjacent panels (201, 202) being part of a corresponding pair of opposing edges (101, 103; 102, 103) of said adjacent panels (201, 202). The coupling of the first and second panel patterns (206, 207) is however realized through the connection of a panel (201, 202) of first panel pattern (206) with an edge (101, 103) forming part of one pair of opposing edges (101, 103) to a panel (201, 202) of second panel pattern (207) with an edge (102, 103) forming part of the other, non-corresponding pair of opposing edges (102, 103). The result is an interconnected, multi-purpose panel system (200) comprising two different panel patterns (206, 207) that are rotated 90 degrees relative to each other. Installation of the panel system (200) shown in FIG. 2b is typically analogous to the installation of the panel system (110) shown in FIG. 1b.

Figure 3A:
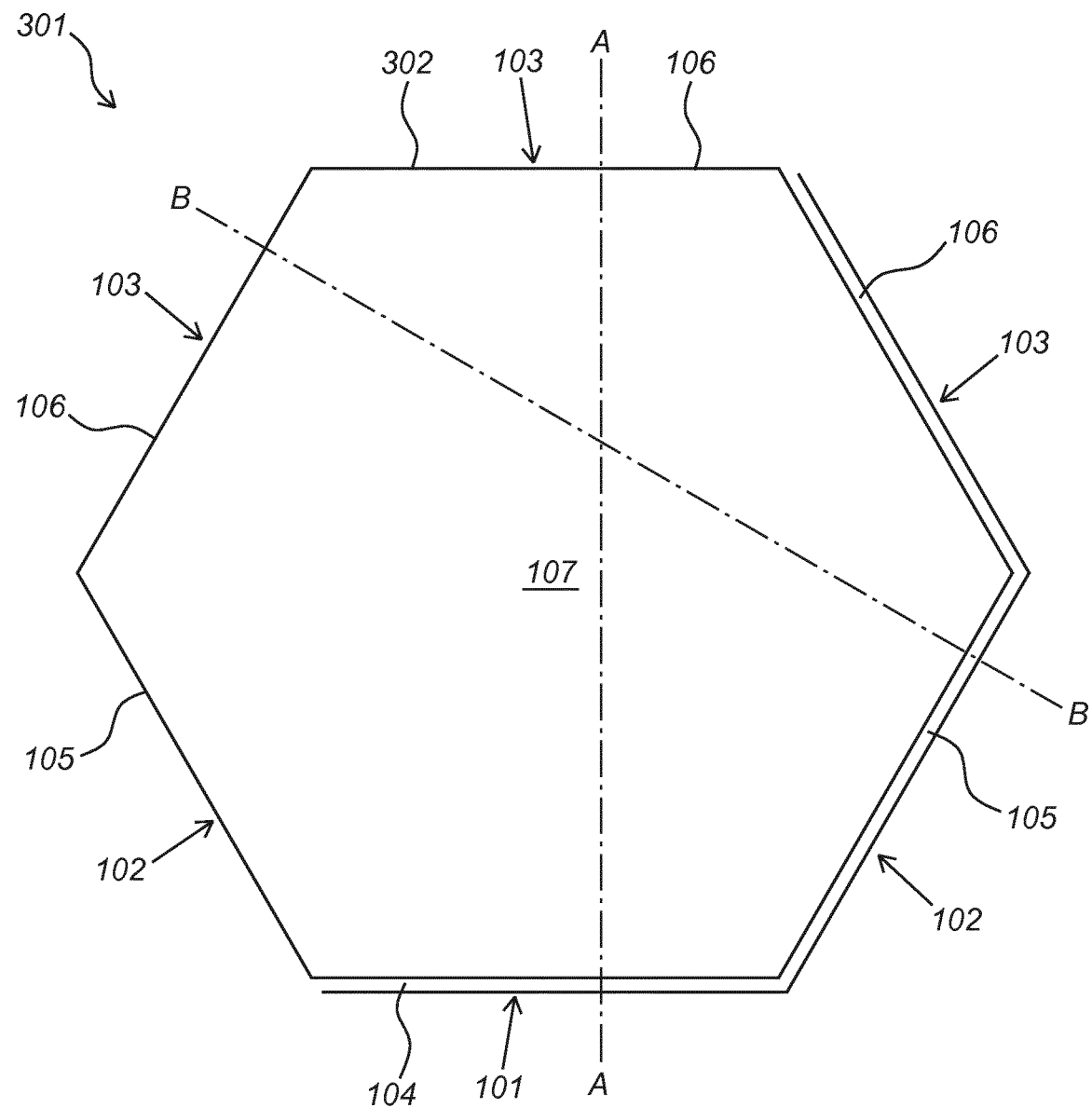
FIG. 3*a* shows a schematic representation of a multi-purpose panel for use in yet another embodiment of a multi-purpose panel system according to the invention.

FIG. 3a shows a schematic representation of a multi-purpose panel (301) for use in yet another embodiment of a multi-purpose panel system (300) according to the invention. Other than the multi-purpose panels (100, 201, 202) shown in FIGS. 1a and 2a, each of these panels (301) comprises three pairs of opposing edges and has an upper side (107) with a regular hexagon-shaped contour (302). The first pair of opposing edges consists of a first edge (101) and an opposite third edge (103). The second and third pair of opposing edges consist of a second edge (102) and an opposing third edge (103). The first, second and third edges (101, 102, 103) are hereby positioned such that the third edges (103) lie directly adjacent to each other and the second edges (102) lie on both edges adjacent to the first edge (101). The second edges (102), as a consequence, do not lie adjacent to each other. The commonality between these multi-purpose panels (301) and the multi-purpose panels (100, 201, 202) shown in FIGS. 1a and 2a is however that the first, second and third edges (101, 102, 103) are respectively provided with first, second and third coupling profiles (104, 105, 106), wherein the first coupling profile (104) and the third coupling profile (106) are configured such that two panels (301) can be coupled to each other at the first and third edges (101, 103) by means of a turning movement, and the second coupling profile (105) and the third coupling profile (106) are configured such that the two panels (301) can be coupled to each other at the second and third edges (102, 103) by means of a fold-down movement and/or a vertical movement.

Figure 3B:
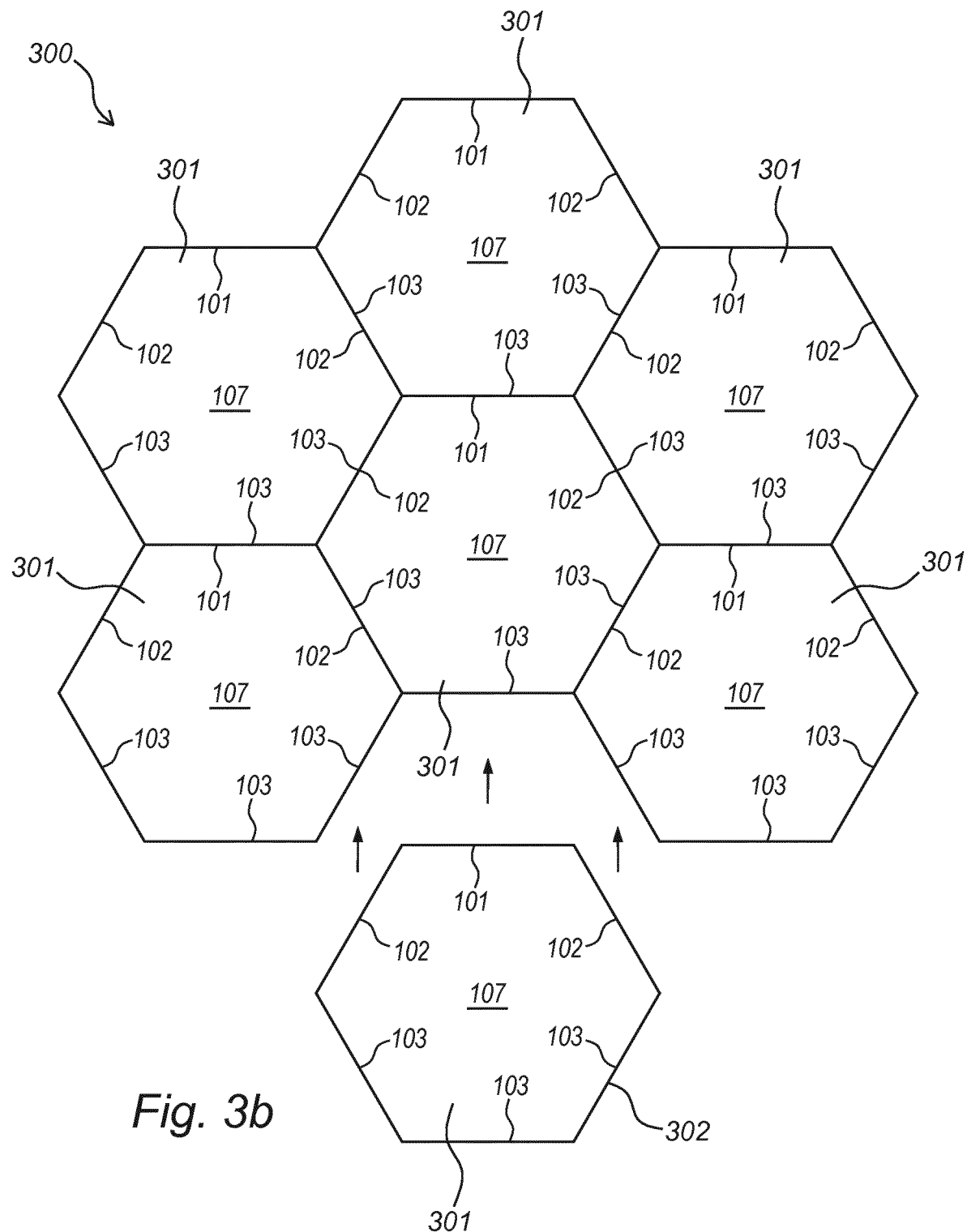
FIG. 3*b* shows a schematic representation of a multi-purpose panel system comprising a plurality of multi-purpose panels as shown in FIG. 3*a;*

FIG. 3b shows a schematic representation of a multi-purpose panel system (300) comprising a plurality of multi-purpose panels (301) as shown in FIG. 3a. In the depicted panel formation, the panels (301) are all identically oriented. Installation of the panel system (300) can be realized in a similar fashion as the panel systems (110, 200) of FIGS. 1b and 2b. By angling down the first edge (101) of a panel (301) to be installed with respect to a third edge (103) of an already installed panel (301), said panels (301) will commonly mutually lock in both vertical and horizontal direction. During this angling or turning movement of the panel (301) to be installed with respect to the already installed panel (301), one or more second edges (102) of the panel (300) to be installed will be connected (simultaneously) to a third edge (103) of one or more other already installed, adjacent panels (301), which is typically realized by lowering or folding down the panel (301) to be installed with respect to the other already installed panel(s) (301) during which said second edge(s) (102) of the panel (301) to be installed and the third edge(s) (103) of the other already installed panel(s) (301) will be scissored (zipped) into each other. This results in a locking of the panel (301) to be installed with respect to the other already installed panel(s) (301) both in horizontal and vertical direction.

Figure 4A:
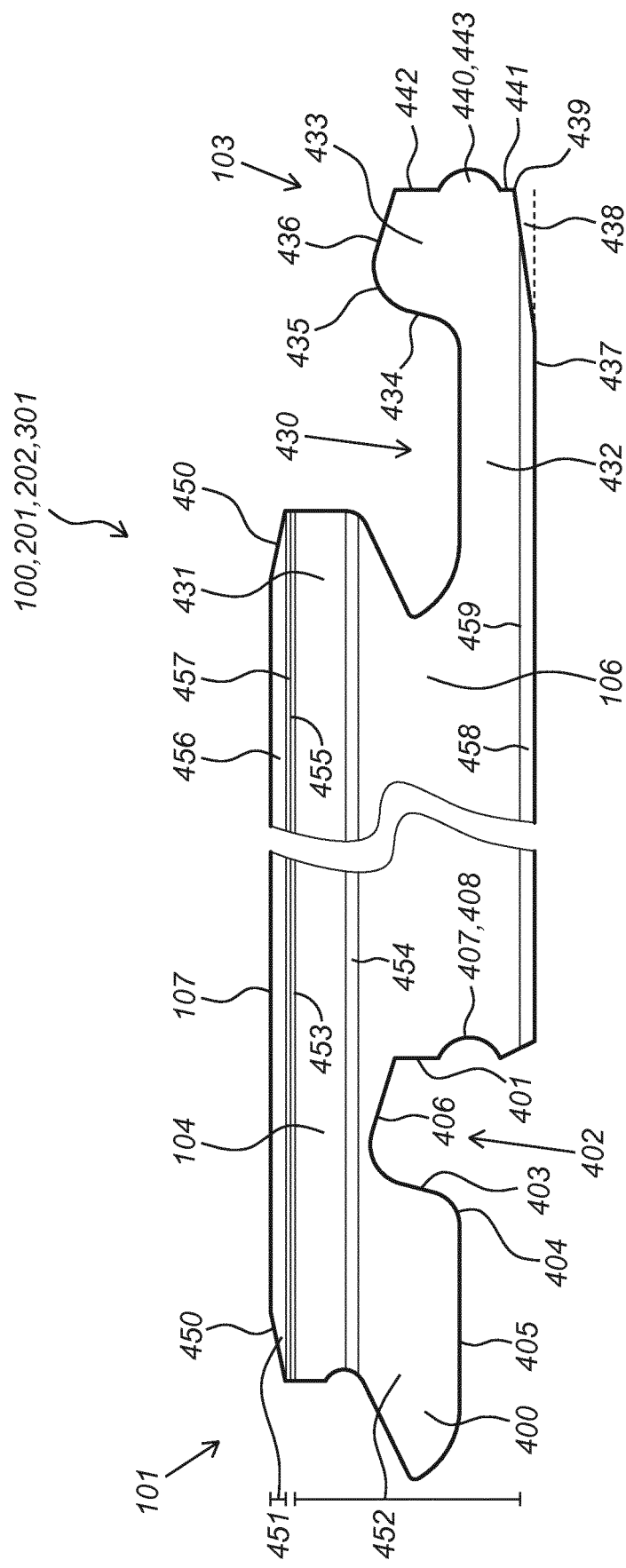
FIG. 4*a* shows a cross-section along line A-A of a multi-purpose panel as shown in FIG. 1*a,* 2*a* or 3*a;*

FIG. 4a shows a cross-section along line A-A of a multi-purpose panel (100, 201, 202, 301) as shown in figures la, 2a or 3a. In the figure, the first edge (101) and an opposing third edge (103) of the panel (100, 201, 202, 301) are visible, having a first coupling profile (104) and a third coupling profile (106) respectively. The first coupling profile (104) comprises a sideward tongue (400) extending in a direction substantially parallel to the upper side (107) of the panel (100, 201, 202, 301), at least one first downward flank (401) lying at a distance from the sideward tongue (400), and a first downward recess (402) formed between the sideward tongue (400) and the first downward flank (401). The proximal side (403) of the sideward tongue (400) of the first coupling profile (104), facing the first downward recess (402), is hereby downwardly inclined in a direction away from the first downward flank (401). It is however likewise possible that the proximal side (403) of the sideward tongue (400) is downwardly inclined in a direction towards the first downward flank (401). A first transition zone (404) can be defined between the proximal side (403) of the sideward tongue (400) of the first coupling profile (104) and a lower side (405) of the sideward tongue (400) of the first coupling profile (104), which first transition zone (404) is in this instance curved. The upper side (406) of the first downward recess (402) is in the depicted panel (100, 201, 202, 301) inclined downwardly towards the first downward flank (401). The first coupling profile (104) may furthermore comprise a first locking element (407) which may, in a coupled position, co-act with a third locking element (440) of a third coupling profile (106) of an adjacent panel (100, 201, 202, 301). This first locking element (407) may be provided at the first downward flank (401) of the first coupling profile (104). In the presently depicted panel (100, 201, 202, 301), the first locking element (407) comprises at least one first locking groove (408).

The third coupling profile (106) comprises a third recess (430) configured for accommodating at least a part of the sideward tongue (400) of the first coupling profile (104) of a further panel (100, 201, 202, 301), said third recess (430) being defined by an upper lip (431) and a lower lip (432), wherein said lower lip (432) is provided with an upward locking element (433). The proximal side (434) of the upward locking element (433) of the third coupling profile (106), facing the third recess (430), is upwardly inclined in a direction away from the upper lip (431). It may however be possible as an alternative that the proximal side (434) of the upward locking element (433) is upwardly inclined in a direction towards the upper lip (431). A third transition zone (435) can be defined between the proximal side (434) of the upward locking element (433) and an upper side (436) of the upward locking element (433), which third transition zone (435) is in this instance also curved to follow the curved first transition zone (404). The upper side (436) of the upward locking element (433) is in the depicted panel (100, 201, 202, 301) inclined downwardly in a direction facing way from the upper lip (431) of the third coupling profile (106). At the lower side (437) of the lower lip (432) of the third coupling profile (106), a recess (438) is present, which extends up to the distal end (439) of the lower lip (432). This recess (438) allows bending of the lower lip (432) in a downward direction. As already mentioned, the third coupling profile (106) may further comprise a third locking element (440) that may co-act with the first locking element (407) of the first coupling profile (104) of an adjacent panel (100, 201, 202, 301) to establish a vertical lock between the coupled panels (100, 201, 202, 301). The third locking element (440) may hereto provided at a distal side (441) of the lower lip (432) facing away from the third recess (430) and/or at a distal side (442) of the upward locking element (433) facing away from the third recess (430). The third locking element (440) may, as depicted here, specifically be positioned at a distance both from a lower side (437) of the lower lip (432) and an upper side (436) of the upward locking element (433). In the presently depicted panel, the third locking element (440) comprises at least one outward bulge (443) which outward bulge (443) is adapted to be at least partially received in the first locking groove (408) or a second locking groove (423) of an adjacent coupled panel (100, 201, 202, 301) for the purpose of realizing a (vertically) locked coupling. The core (452) is provided with at least one reinforcing layer (454), such as a glass fibre layer (cloth), incorporated (embedded), in the core (452). The core (452) is at least partially made of an alloy of a polymer matrix and elastic particles dispersed in said matrix, wherein the elastic particles are bond to the polymer matrix by means of a covalent bond. Examples have been given above and in the appended claim set. The polymer matrix may optionally be provided with at least one plasticizer. Alternatively, the core comprises a mineral, such as magnesium oxide, magnesium hydroxide, and/or magnesium cement. This mineral material may function as matrix material, instead of or in addition to a polymeric matrix material. Optionally, the panel, and also optionally solely the coupling profiles, may be provided with at least one antibacterial (antimicrobial) coating and/or antibacterial (antimicrobial) substance mixed with the core material and/or the top structure of said panel. Optionally, on top of the top structure a antimicrobial coating may be applied, though it is may be preferred not to expose the antimicrobial substance to the (upper) outer world during normal use for health safety reasons. The core may comprises further additives, such as calcium carbonate and/or cellulose based particles dispersed in said polymer (matrix); and, in this embodiment, at least one reinforcement layer (454) embedded in said core. The shown core may be considered as a single layer, although a part is situated above the reinforcement layer (454) and a part is situated below the reinforcement layer (454), wherein both parts are mutually (integrally) connected by composite material present in the pores of the reinforcement layer. Examples of detailed compositions and additives have been described in the above already in a comprehensive manner.

Figure 4B:
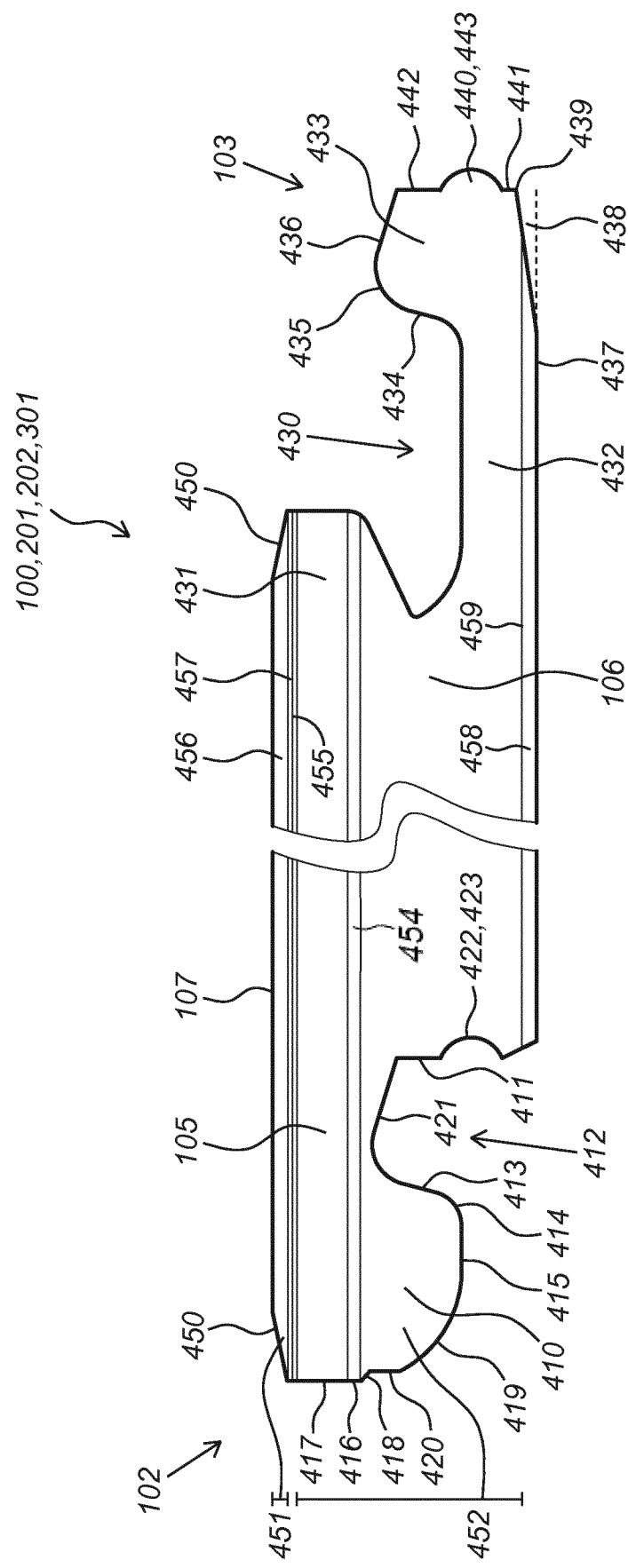
FIG. 4*b* shows a cross-section along line B-B of a multi-purpose panel as shown in FIG. 1*a,* 2*a* or 3*a;*

FIG. 4b shows a cross-section along line B-B of a multi-purpose panel (100, 201, 202, 301) as shown in FIG. 1a, 2a or 3a. In the figure, the second edge (102) and another opposing third edge (103) of the panel (100, 201, 202, 301) are visible, having a second coupling profile (105) and a third coupling profile (106) respectively. Where the third coupling profile (106) matches the third coupling (106) profile provided on the adjacent third edge (103) of the panel (100, 201, 202, 301), which characteristics are given above in the description of the cross-section along line A-A of the multi-purpose panel (100, 201, 202, 301), the second coupling profile (105) comprises a downward tongue (410) extending in a direction substantially perpendicular to the upper side (107) of the panel (100, 201, 202, 301), at least one second downward flank (411) lying at a distance from the downward tongue (410), and a second downward recess (412) formed between the downward tongue (410) and the second downward flank (411). The proximal side (413) of the downward tongue (410) of the second coupling profile (105), facing the second downward recess (412), is hereby downwardly inclined in a direction away from the second downward flank (411). It is however also possible that the proximal side (413) of the downward tongue (410) is downwardly inclined in a direction towards the second downward flank (411). A second transition zone (414) can be defined between the proximal side (413) of the downward tongue (410) of the second coupling profile (105) and a lower side (415) of the downward tongue (410) of the second coupling profile (105), which second transition zone (414) is in this instance curved. A distal side (416) of the downward tongue (410), facing away from the second downward recess (412), comprises at least a vertical upper wall part (417) adjacent to the upper side (107) of the panel (100, 201, 202, 301), and, adjacent to and located below said vertical upper wall part (417), an angled wall part (418) that angles inward toward a chamfered and/or curved lower wall part (419) of said distal side (416) of the downward tongue (410). An intermediate vertical wall part (420) may hereby be present between the angled wall part (418) and the chamfered and/or curved lower wall part (419). The lower wall part (419) of distal side (416) of the downward tongue (410) may moreover be connected to the lower side (415) of the downward tongue (410). The upper side (421) of the second downward recess (412) is in the depicted panel (100, 201, 202, 301) inclined downwardly towards the second downward flank (411). The second coupling profile (105) may furthermore comprise at least one second locking element (422) which may, in a coupled position, co-act with a third locking element (440) of a third coupling profile (106) of an adjacent panel (100, 201, 202, 301) to establish a vertical lock between the panels (100, 201, 202, 301). The second locking element (422) may hereto be provided at the second downward flank (411) of the second coupling profile (105). In the presently depicted panel (100, 201, 202, 301), the second locking element (422) comprises at least one second locking groove (423) adapted to at least partially receive the outward bulge (443) of the third locking element (440) of an adjacent coupled panel (100, 201, 202, 301) for the purpose of realizing a (vertically) locked coupling.

The coupling profiles (104, 105, 106) of each of the multi-purpose panels (100, 201, 202, 301) shown in FIGS. 4a and 4b are provided with chamfers (bevels) (450) at or near the upper side (107) of the panels (100, 201, 202, 301). The panels (100, 201, 202, 301) comprise an upper substrate (451) affixed to an upper side (453) of a core (452) to which the first, second and third coupling profiles (104, 105, 106) are integrally connected. The at least one reinforcing layer (454), such as a glass fibre layer (cloth), as embedded in the core (452), is visualized again. Both FIG. 4a and FIG. 4b shows that this reinforcing layer (454) is present only in one of two complementary coupling profiles. The upper substrate (451) comprises a decorative layer (455), an abrasion resistant wear layer (456) covering said decorative layer (455) and a transparent finishing layer (457) situated in between the decorative layer (455) and the wear layer (456). The panels (100, 201, 202, 301) moreover comprise a backing layer (458) affixed to a bottom side (459) of the core (452).

Figure 5C:
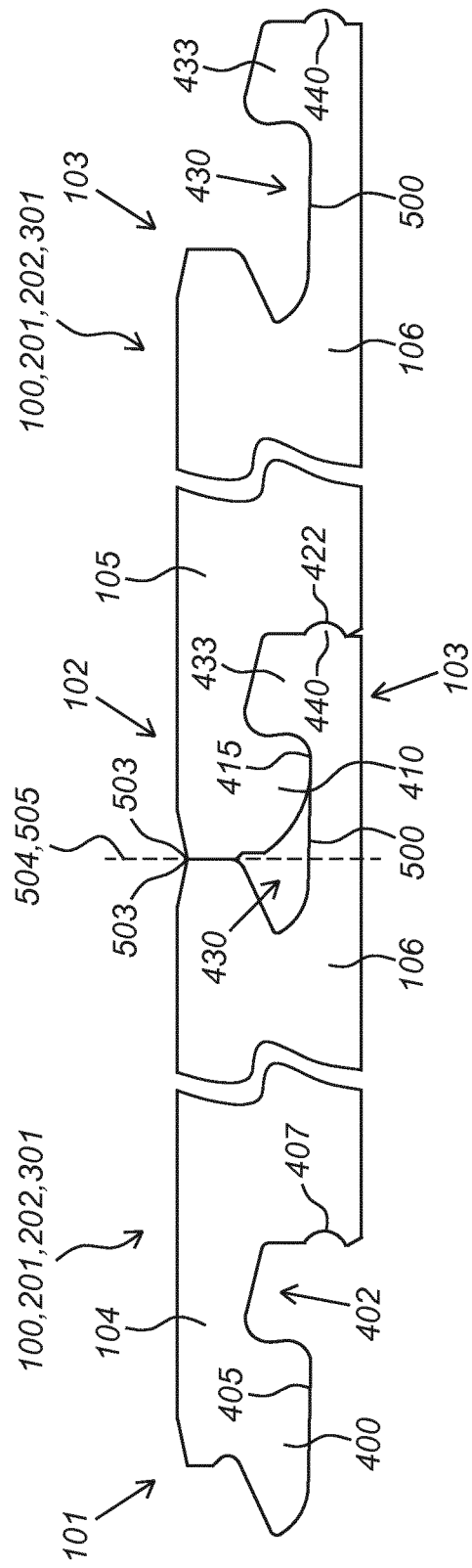

FIGS. 5a-5c show a cross-section of two multi-purpose panels (100, 201, 202, 301) as shown in FIG. 1a, 2a or 3a in a first, second and third coupled condition respectively. In these figures it can be seen that in coupled condition, at least a part of the sideward tongue (400) of the first coupling profile (104) of a panel (100, 201, 202, 301) is inserted into the third recess (430) of the third coupling profile (106) of an adjacent panel (100, 201, 202, 301), and at least a part of the upward locking element (433) of the third coupling profile (106) is inserted into the first downward recess (402) of the first coupling profile (104). To establish a fixation in the mutual position of the first coupling profile (104) and the third coupling profile (106), a lower side (405) of the sideward tongue (400) of the first coupling profile (104) may hereby be supported by a lower surface (500) of the third recess (430) of the third coupling profile (106). The first edge (101) and the third edge (103), in coupled condition, define a first closing surface (501) defined as a first vertical plane (502) through the upper edges (503) of the coupled panels (100, 201, 202, 301). Each of the sideward tongue (400) and the third recess (430) hereby extends through said first vertical plane (502). In the shown embodiments, the first and third coupling profiles (104, 106) respectively comprise a first and third locking element (407, 440). The first and third locking element (407, 440) are hereby positioned such that the first locking element (407) is facing and co-acting with the third locking element (440) of the third coupling profile (106) to realise a vertical locking effect.

FIGS. 5a-5c moreover show that in coupled condition, at least a part of the downward tongue (410) of the second coupling profile (105) is inserted in the third recess (430) of the third coupling profile (106), and at least a part of the upward locking element (433) of the third coupling profile (106) is inserted in the second downward recess (412) of second coupling profile (105). To establish a fixation in the mutual position of the second coupling profile (105) and the third coupling profile (106), a lower side (415) of the downward tongue (410) of the second coupling profile (105) may hereby be supported by a lower surface (500) of the third recess (430) of the third coupling profile (106). The second edge (102) and the third edge (103), in coupled condition, define a second closing surface (504) defining a second vertical plane (505) through the upper edges (503) of the coupled panels (100, 201, 202, 301). The downward tongue (410) is hereby positioned at one side of said second vertical plane (505), while the third recess (430) extends through said second vertical plane (505). In the shown embodiments, the second coupling profile (105) moreover comprises a second locking element (422). Said second locking element (422) is facing and co-acting with the third locking element (440) of the third coupling profile (106) to realise a vertical locking effect.

Figure 6A:
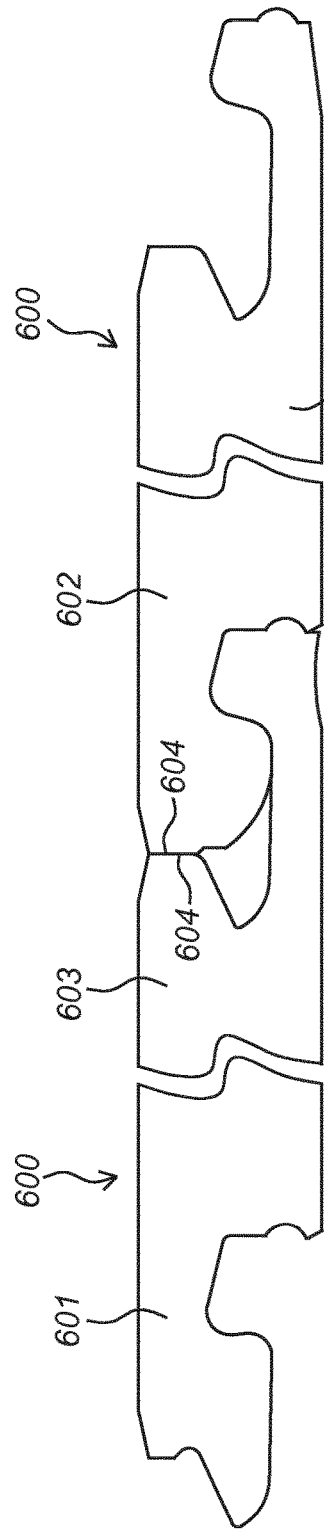
FIGS. 6a-6c show a cross-section of two multi-purpose panels with alternative coupling profiles in a first, second and third coupled condition respectively.
Figure 6B:
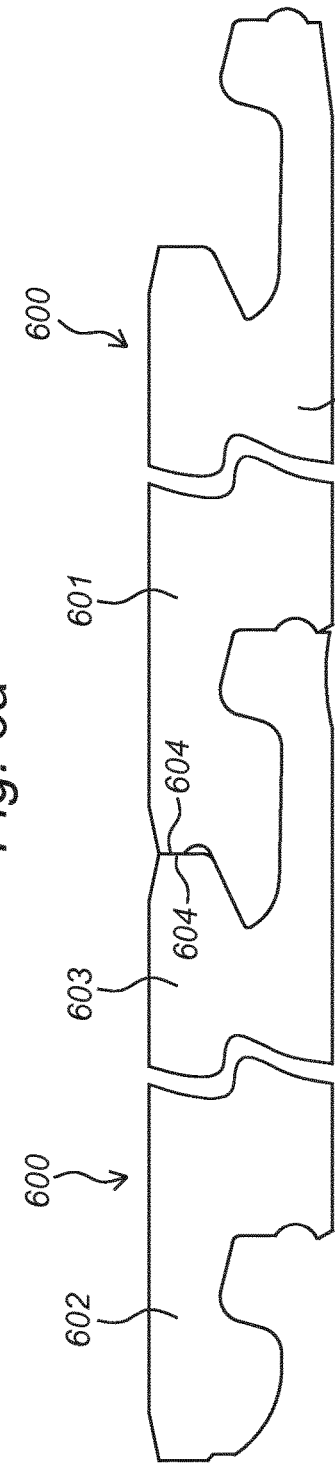
Figure 6C:
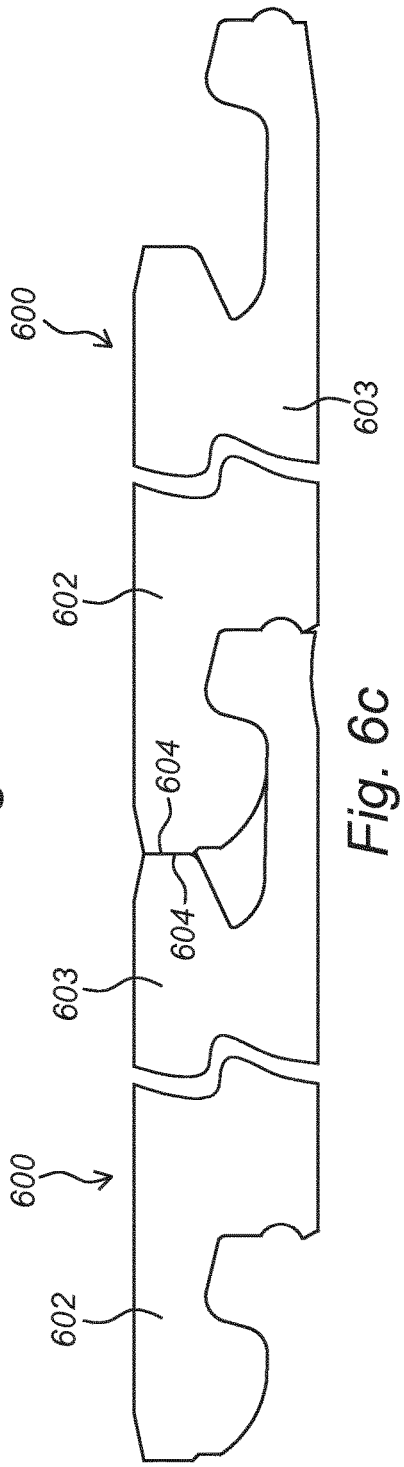

FIGS. 6a-6c show a cross-section of two multi-purpose panels (600) with alternative coupling profiles (601, 602, 603) in a first, second and third coupled condition respectively. Wherein the coupling profiles (104, 105, 106) of the panels (100, 201, 202, 301) shown in FIGS. 5a-5c are configured such that in a coupled condition, (substantially) no pretension exists between the coupling profiles (104, 105, 106), the coupling profiles (601, 602, 603) of the panels (600) shown in FIGS. 6a-6c are configured such that in coupled condition a pretension is existing, which forces the respective panels (600) at their respective edges (604) towards each other. In the shown embodiments of the coupling profiles (601, 602, 603), the pretension is the result of a (local) deformation of the coupling profiles (601, 602, 603).

Figure 7C:
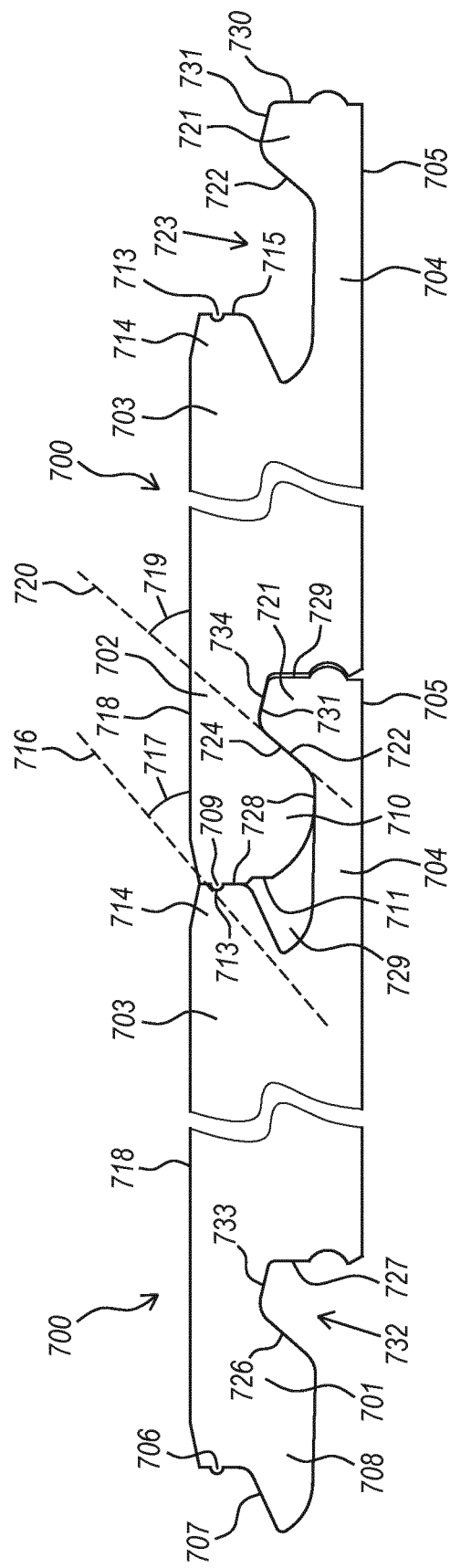

FIGS. 7a-7c show a cross-section of two multi-purpose panels (700) with further alternative coupling profiles (701, 702, 703) in a first, second and third coupled condition respectively. In this embodiment of the third coupling profile (703), no recess is present at the lower side (705) of the lower lip (704) thereof. In the depicted multi-purpose panels (700), the first coupling profile (701) moreover comprises another first locking element (706), provided at a distal side (707) of the first coupling profile (701), being located above at least a part of the sideward tongue (708). In addition, the second coupling profile (702) comprises another second locking element (709), provided at a distal side (711) of the downward tongue (710) facing away from the second downward recess (712). The third coupling profile (703) also comprises another, third, locking element (713), provided at a side (715) of the upper lip (714). In the coupled conditions shown in FIGS. 7a and 7b, the additional third locking element (713) faces the distal side (707) of the first coupling profile (701) of the adjacent panel (700), while in the coupled condition shown in FIG. 7c, the additional third locking element (713) faces the distal side (711) of the downward tongue (710) of the second coupling profile (702) of an adjacent panel (700). Further depicted in FIGS. 7a-7c is the co-action between the additional first or second locking element (706, 709) and the additional third locking element (713) for creating a vertical locking effect in coupled condition of two panels (700), defines a tangent T1 (716) which encloses an angle A1 (717) with a plane (718) defined by the panel (700), which angle A1 (717) is smaller than an angle A2 (719) enclosed by said plane (718) defined by the panel (700) and a tangent T2 (720) defined by a co-action between an inclined part of a proximal side (722) of the upward locking element (721) facing toward the third recess (723) and an inclined part of a proximal side (724) of the downward tongue (710) facing toward the second downward flank (725) respectively an inclined part of a proximal side (726) of the sideward tongue (708) facing toward the first downward flank (727).

In the embodiments of the coupling profiles (701, 702, 703) shown in FIGS. 7a-7c, the first coupling profile (701) and the third coupling profile (703) respectively the second coupling (702) and the third coupling profile (703) are configured such that in coupled condition a plurality of distant contact zones (728) are present, wherein in between each pair of adjacent contact zones (728) a space (729) remains. Specifically, FIGS. 7a and 7b show that the first downward flank (727) of the first coupling profile (701) and a distal side (730) of the upward locking element (721) and the lower lip (704) of the third coupling profile (703), facing the first downward flank (727), are positioned at a distance from each other. Additionally, the upper side (731) of the upward locking element (721) of the third coupling profile (703) is positioned at a distance from the upper side (733) of the first downward recess (732) of the first coupling profile (701). In FIG. 7c one can see that the second downward flank (725) of the second coupling profile (702) and a distal side (730) of the upward locking element (721) and the lower lip (704) of the third coupling profile (703), facing the second downward flank (725), are positioned at a distance from each other. In addition, the upper side (731) of the upward locking element (721) of the third coupling profile (703) is positioned at a distance from the upper side (734) of the second downward recess (712) of the second coupling profile (702).

In the embodiments shown in FIGS. 5a-7c, wherein said core comprises an alloy of a polymer matrix and elastic particles dispersed in said matrix, wherein the elastic particles are bond to the polymer matrix by means of a covalent bond. Examples and preferred embodiments of this alloy have been described in the description above in a comprehensive manner.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A decorative panel, comprising:
   a core provided with an upper side and a lower side,
   a decorative top structure affixed on said upper side of the core,
   a first panel edge comprising a first coupling profile, and a second panel edge comprising a second coupling profile being designed to engage interlockingly with said first coupling profile of an adjacent panel, both in horizontal direction and in vertical direction,
   wherein said core comprises an alloy of a polymer matrix and/or a magnesium cement based matrix and elastic particles dispersed in said matrix, wherein the elastic particles are bond to the polymer matrix and/or the magnesium cement based matrix by means of a covalent bond, and
   wherein the polymer matrix comprises polyethylene (PE), and/or polypropylene (PP) and/or polybutylene.

2. The panel according to claim 1, wherein the polymer matrix comprises isotactic polypropylene.

3. The panel according to claim 1, wherein the elastic particles comprise an elastomer.

4. The panel according to claim 1, wherein the elastic particles comprise ethylene-propylene rubber.

5. The panel according to claim 1, wherein the elastic particles comprise ethylene-propylene-diene terpolymer (EPDM).

6. The panel according to claim 1, wherein the core comprises an isotactic polypropylene, an ethylene-propylene rubber, and a high density polyethylene.

7. The panel according to claim 1, wherein the core comprises an ethylene-propylene copolymer.

8. The panel according to claim 1, wherein the core is free of phthalate.

9. The panel according claim 1, wherein at least one polymer of the core is a material chosen from the group consisting of: PVC (polyvinyl chloride), PUR (polyurethane), PVB (polyvinyl butyral), and polystyrene.

10. The panel according to claim 1, wherein the core comprises at least one catalyst to promote the formation of covalent bonds between the polymer matrix and the dispersed elastic particles.

11. The panel according to claim 1, wherein the core comprises at least one additional filler selected from the group consisting of: steel, glass, polypropylene, wood, acrylic, alumina, curaua, carbon, cellulose, coconut, kevlar, nylon, perlon, polyethylene, PVA, rock wool, sisal, and fique.

12. The panel according to claim 1, wherein at least one polymer of the core is foamed.

13. The panel according to claim 1, wherein the panel comprises a plurality of reinforcement layers.

14. The panel according to claim 13, wherein at least one reinforcement layer extends in only one coupling profile of the first and second coupling profile.

15. The panel according to claim 1, wherein the panel comprises:
   at least one first edge having a first coupling profile comprising:
      a sideward tongue extending in a direction substantially parallel to the upper side of the first panel,
      at least one first downward flank lying at a distance from the sideward tongue, and
      a first downward recess formed between the sideward tongue and the first downward flank,
      wherein at least a part of the proximal side of the sideward tongue of the first coupling profile, facing the first downward recess, is downwardly inclined in a direction away from the first downward flank;
   at least one second edge having a second coupling profile comprising:
      a downward tongue extending in a direction substantially perpendicular to the upper side of the first panel,
      at least one second downward flank lying at a distance from the downward tongue,
      a second downward recess formed between the downward tongue and the downward flank, and
      at least one second locking element,
      wherein at least a part of the proximal side of the downward tongue, facing the second downward recess, is downwardly inclined in a direction away from the second downward flank,
   at least two other edges, each other edge having a third coupling profile comprising:
      a third recess configured for accommodating at least a part of the sideward tongue of the first coupling profile of a second panel of the plurality of floor panels and at least a part of the downward tongue of the second panel, said third recess being defined by an upper lip and a lower lip, wherein said lower lip is provided with an upward locking element, and
      at least one third locking element, wherein said third locking element comprises at least one outward bulge,
      wherein at least a part of the proximal side of the upward locking element, facing the third recess, is upwardly inclined in a direction away from the upper lip;

wherein the first coupling profile and the third coupling profile are configured such that the first panel and the second panel can be coupled to each other at the first and other edges through a turning movement, wherein, in coupled condition:

at least a part of the sideward tongue of the first coupling profile of the first panel is inserted into the third recess of the third coupling profile of the second panel to realise a vertical locking effect, and at least a part of the upward locking element of the third coupling profile, and said at least one outward bulge, are inserted into the first downward recess of the first coupling profile, and wherein the second coupling profile and the third coupling profile are configured such that the first panel and the second panel can be coupled to each other at the second and other edges by means of a fold-down movement or a vertical movement, wherein, in coupled condition:

at least a part of the downward tongue of the second coupling profile is inserted in the third recess of the third coupling profile, at least a part of the upward locking element of the third coupling profile is inserted in the second downward recess of the second coupling profile, and at least one second locking element is facing, and co-acting with, at least one outward bulge of at least one third locking element to realise a vertical locking effect.

16. The panel according to claim 1, wherein the first coupling profile comprises:

an upward tongue, at least one upward flank lying at a distance from the upward tongue, an upward groove formed in between the upward tongue and the upward flank wherein the upward groove is adapted to receive at least a part of a downward tongue of a second coupling profile of an adjacent panel, and at least one first locking element, and wherein the second coupling profile comprises:

a first downward tongue, at least one first downward flank lying at a distance from the downward tongue, a first downward groove formed in between the downward tongue and the downward flank, wherein the downward groove is adapted to receive at least a part of an upward tongue of a first coupling profile of an adjacent panel, and at least one second locking element adapted for co-action with a first locking element of an adjacent panel.

17. The panel according to claim 1, wherein the panel comprises at least one third coupling profile and at least one fourth coupling profile located respectively at a third panel edge and a fourth panel edge, wherein the third coupling profile comprises:

a sideward tongue extending in a direction substantially parallel to the upper side of the core, at least one second downward flank lying at a distance from the sideward tongue, and a second downward groove formed between the sideward tongue and the second downward flank, wherein the fourth coupling profile comprises:

a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

18. The panel according to claim 1, wherein the core comprises at least one mineral material.

19. A decorative covering, comprising a plurality of mutually coupled decorative panels according to claim 1.

* * * * *